(12) United States Patent
Yasutake

(10) Patent No.: US 9,947,139 B2
(45) Date of Patent: Apr. 17, 2018

(54) METHOD AND APPARATUS FOR PROVIDING HYBRID REALITY ENVIRONMENT

(71) Applicant: Sony Interactive Entertainment America LLC, San Mateo, CA (US)

(72) Inventor: Taizo Yasutake, Cupertino, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 22 days.

(21) Appl. No.: 14/744,595

(22) Filed: Jun. 19, 2015

(65) Prior Publication Data
US 2015/0371447 A1 Dec. 24, 2015

Related U.S. Application Data

(60) Provisional application No. 61/998,163, filed on Jun. 20, 2014.

(51) Int. Cl.
*G06T 19/00* (2011.01)

(52) U.S. Cl.
CPC ...... *G06T 19/006* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 6,999,093 B1* | 2/2006 | Wetzel | G06T 15/50 345/428 |
| 2003/0032484 A1* | 2/2003 | Ohshima | A63F 13/10 463/43 |
| 2005/0255437 A1* | 11/2005 | Knight | G09B 23/28 434/317 |
| 2013/0141419 A1* | 6/2013 | Mount | G06F 3/011 345/419 |
| 2013/0187952 A1* | 7/2013 | Berkovich | G01S 5/16 345/633 |
| 2014/0357361 A1* | 12/2014 | Rajaraman | G07F 17/323 463/31 |

OTHER PUBLICATIONS

Milgram, "A Taxonomy of Mixed Reality Visual Displays," IEICE Transactions on Information Systems, vol. E77-D, No. 12 Dec. 1994.

* cited by examiner

*Primary Examiner* — Mark Zimmerman
*Assistant Examiner* — Nurun N Flora
(74) *Attorney, Agent, or Firm* — Martine Penilla Group, LLP

(57) ABSTRACT

A method for generating a hybrid reality environment includes receiving data of a first user and a second user at different locations. The method also includes generating a scene of an augmented reality (AR) based environment that includes the first user and a virtual object related to the second user; and generating a scene of an augmented virtuality (AV) based environment that includes the virtual object related to the second user and a virtual object related to the first user. The method further includes sending signals for displaying the scene of the AR based environment to the first user and displaying the scene of the AV based environment to the second user such that the first user can interact with the virtual object related to the second user in real time and the second user can interact with the virtual object related to the first user in real time.

23 Claims, 20 Drawing Sheets

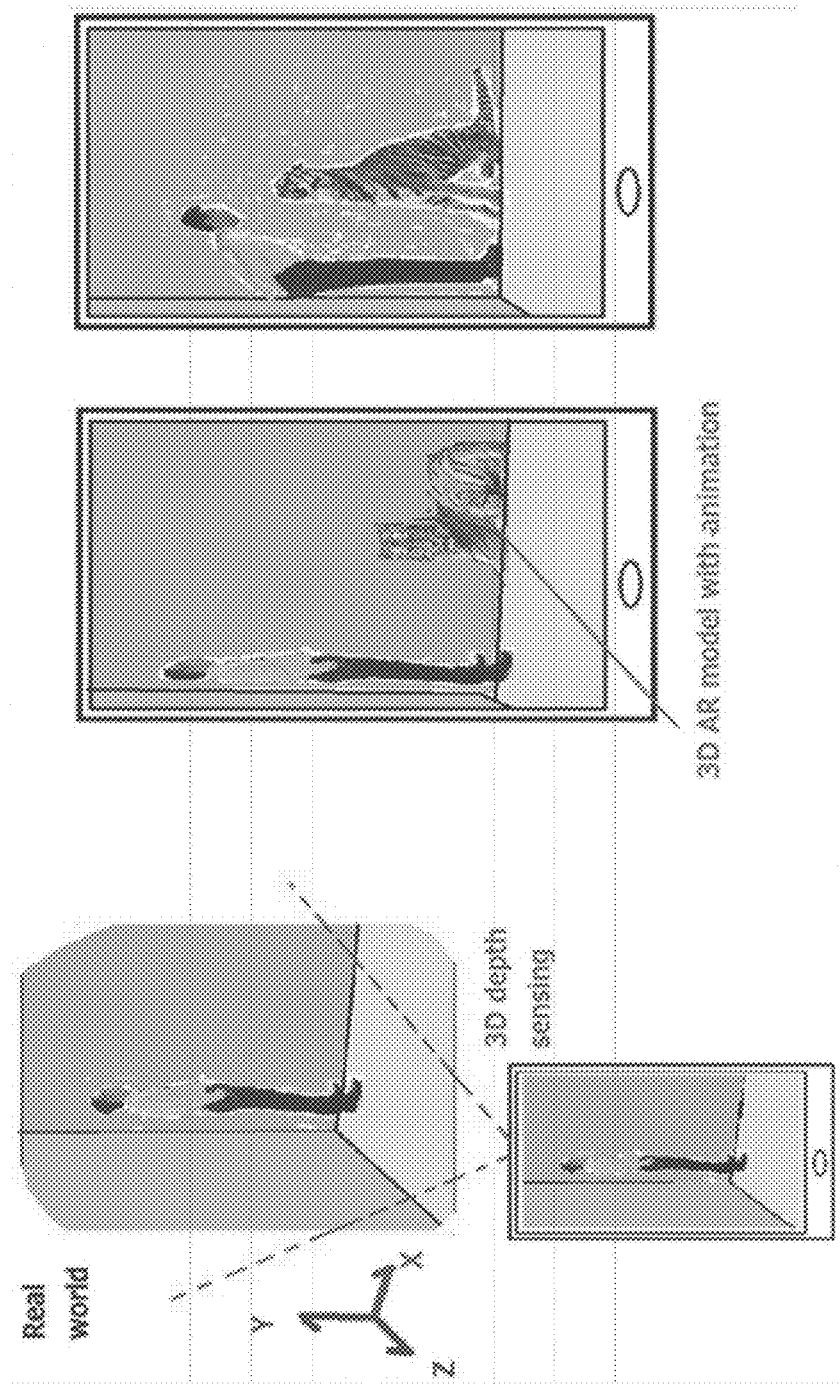

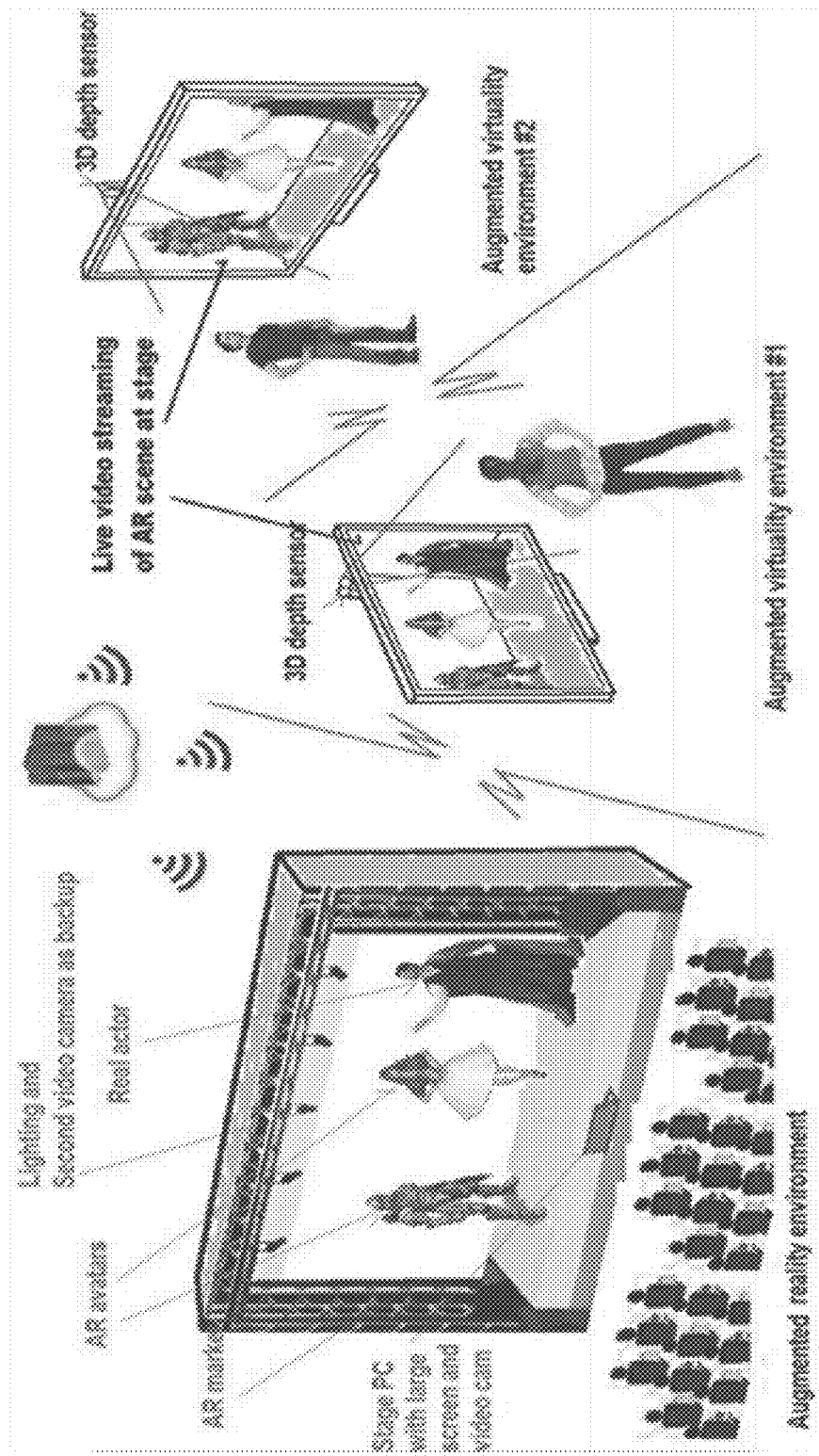

METHOD AND APPARATUS FOR PROVIDING HYBRID REALITY ENVIRONMENT

PRIORITY CLAIM AND RELATED APPLICATION

This application claims priority to U.S. Provisional Application No. 61/998,163, entitled "A New Method to Provide Mixed Reality Environment for the Development of Real Time Interactive Application Software," filed Jun. 20, 2014.

FIELD OF THE APPLICATION

The present application generally relates to the field of computer technologies, and more particularly to a method and apparatus for providing a hybrid reality environment for development of real time interactive application software.

BACKGROUND

Nowadays, some known conventional augmented reality (AR) applications are used to enable users to interact with each other in a virtual environment. Such a conventional AR environment typically refers to a system in which a user views and acts within an enhanced, virtualized version of the real world. The enhancements are virtual and can include two-dimensional (2D) and/or three-dimensional (3D) computer generated objects or information. The known conventional AR applications, however, typically does not include any real object (e.g., a real person). Thus, the known conventional AR applications do not enable a user to interact with real objects in a hybrid reality environment (i.e., an environment where real objects and computer generated objects co-exist and interact in real time).

Therefore, a need exists for a method and apparatus that permit users of computer devices to co-exist and interact with any AR based multi-media information in real time in a hybrid reality environment of real and virtual objects.

SUMMARY

The above deficiencies associated with the known conventional AR applications may be addressed by the techniques described herein.

In some embodiments, a method for generating a hybrid reality environment of real and virtual objects is disclosed. The method is performed at a computer system such as a server device, which has one or more processors and memory for storing a program to be executed by the one or more processors. The method includes receiving data of a first group of users located at a first physical location. In some instances, the data of the first group of users includes data associated with, for example, a location, orientation, posture, or movement of a user from the first group of users. In some instances, the data of the first group of users includes, for example, 3D data associated with the first group of users. In such instances, the 3D data can include, for example, data associated with computer generated 3D geographic map enhanced by texture mapping of earth satellite image.

The method includes receiving data of a second group of users, where each user from the second group of users is located at a physical location different from the first physical location. In some instances, the second group of users includes more than one user, and at least two users from the second group of users are located at two different physical locations. In some instances, the data of the second group of users includes face image data of a user from the second group of users. In such instances, the face image data of the user can include, for example, real-time video and audio data packets including extracted image data of that user's face, which is captured by a video camera for the second group of users.

The method also includes generating a scene of an AR based environment for each user from the first group of users, where the AR based environment includes the first group of users and one or more virtual objects related to the second group of users that are generated based on the data of the second group of users. In some instances, generating the scene of the AR based environment includes scanning a background environment surrounding the first group of users using, for example, a 3D depth sensor. In some instances, generating the scene of the AR based environment includes generating the scene for displaying a movement of a virtual object related to a user from the second group of users, wherein such a movement is controlled by that user in real time.

Similarly, the method includes generating a scene of an augmented virtuality (AV) based environment for each user from the second group of users, where the AV based environment includes the one or more virtual objects related to the second group of users and one or more virtual objects related to the first group of users that are generated based on the data of the first group of users. In some instances, the AV based environment is a virtualized realization of the AR based environment. In some instances, generating the scene of the AV based environment includes generating the scene for displaying a movement of a virtual object related to a user from the first group of users that corresponds to a movement of that user in real time. Moreover, in some instances, generating the scene of the AR based environment or the scene of the AV based environment includes generating a virtual object related to a user from the second group of users by, for example, mapping a picture of that user onto a surface of an AR object associated with that user.

The method further includes sending signals for displaying the scene of the AR based environment to a user from the first group of users such that the user can interact with the one or more virtual objects related to the second group of users in real time within the AR based environment. In some instances, the scene of the AR based environment displayed to the user from the first group of users does not include a virtual object related to that user. In some instances, the method includes sending the signals to a computer device associated with that user from the first group of users such that the scene of the AR based environment is displayed on the computer device to that user.

The method includes sending signals for displaying the scene of the AV based environment to a user from the second group of users such that the user can manipulate a virtual object related to that user to interact with the one or more virtual objects related to the first group of users in real time within the AV based environment. In some instances, the scene of the AV based environment displayed to the user from the second group of users does not include a virtual object related to that user. In some instances, the method includes sending the signals to a computer device associated with that user from the second group of users such that the scene of the AV based environment is displayed on the computer device to that user.

Additionally, in some instances, the method includes sending signals for displaying, to an audience not included in the first group of users or the second group of users, a set of scenes of the AR based environment that are different from any scene displayed to the first group of users. Similarly, in some instances, the method includes sending signals for displaying, to an audience not included in the first group of users or the second group of users, a set of scenes of the AV based environment that are different from any scene displayed to the second group of users.

In some embodiments, a server device includes one or more processors and memory storing one or more programs for execution by the one or more processors. The one or more programs include instructions that cause the server device to perform the method for generating a hybrid reality environment of real and virtual objects as described above. In some embodiments, a non-transitory computer readable storage medium of a server device stores one or more programs including instructions for execution by one or more processors. The instructions, when executed by the one or more processors, cause the processors to perform the method of generating a hybrid reality environment of real and virtual objects as described above.

In some embodiments, a system including a first user device, a second user device and a server device is disclosed. The first user device is configured to capture data of a first user located at a first physical location, and configured to send data of the first user to the server device. Similarly, the second user device is configured to capture data of a second user located at a physical location different from the first physical location, and configured to send data of the second user to the server device.

The server device is configured to generate a scene of an AR based environment for the first user, wherein the AR based environment includes the first user and a virtual object related to the second user that is generated based on the data of the second group of users. The server device is also configured to generate a scene of an AV based environment for the second user, wherein the AV based environment includes the virtual object related to the second user and a virtual object related to the first user that is generated based on the data of the first user.

The server device is further configured to send signals to the first user device for displaying the scene of the AR based environment on the first user device such that the first user can interact with the virtual object related to the second user in real time within the AR based environment. Similarly, the server device is configured to send signals to the second user device for displaying the scene of the AV based environment on the second user device such that the second user can interact with the virtual object related to the first user in real time within the AV based environment.

Various advantages of the present application are apparent in light of the descriptions below.

BRIEF DESCRIPTION OF DRAWINGS

The aforementioned implementation of the present application as well as additional implementations will be more clearly understood as a result of the following detailed description of the various aspects of the application when taken in conjunction with the drawings.

FIG. 4A is a schematic illustration of collecting 3D depth data of a subject in real time in accordance with some embodiments.

FIG. 4B is a schematic illustration of measuring a distance between the subject in FIG. 4A and a 3D AR object in a scene of an AR based environment in accordance with some embodiments.

FIG. 4C is a schematic illustration of an interaction between the real person and the 3D AR object in the AR based environment of FIG. 4B.

FIGS. 8A-8F are schematic illustrations of generating a hybrid reality environment for performance art in accordance with some embodiments.

Like reference numerals refer to corresponding parts throughout the several views of the drawings.

DETAILED DESCRIPTION

Figure 1:
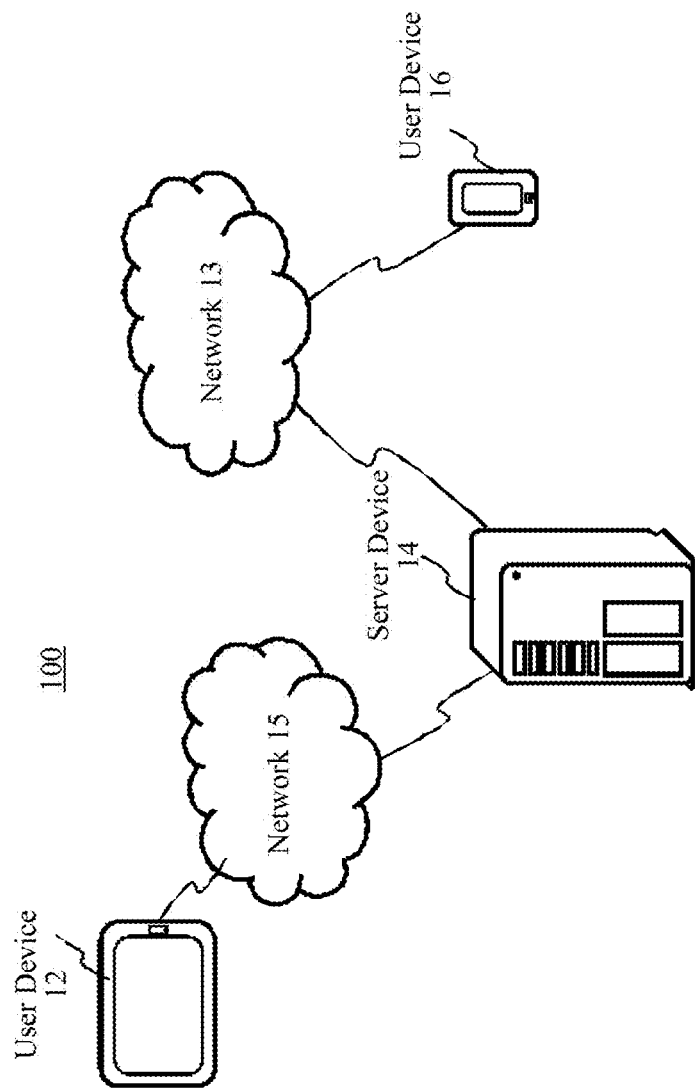
FIG. 1 is a schematic diagram illustrating a system configured to generate a hybrid reality environment in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To promote an understanding of the objectives, technical solutions, and advantages of the present application, embodiments of the present application are further described in detail below with reference to the accompanying drawings.

The present application describes a new method for provision of AR environment. Specifically, the recent development of computer devices such as smart phones or tablet computers and cloud computing services allow software developers to create many AR application programs by overlaying virtual objects and/or additional two dimensional (2D) and/or 3D multi-media information within a captured image of the conventional video camera and/or 3D depth sensing camera. The image sensing devices such as, for example, Kinect from Microsoft or Intel 3D depth sensor, have gained popularity as a new input method for real-time interaction with AR applications. Furthermore, next generation mobile devices such as, for example, Google's TANGO prototype hardware install a 3D depth sensor and a RGB video camera as a standard imaging component.

Using above 3D sensing capability, the new kind of AR game applications, for example, can be developed to realize "hybrid reality" (also referred as "mixed reality" in some embodiments) of real people, AR objects, video streaming data of faces for each user (e.g., a game player), and/or the like. In some embodiments, the data file of 3D virtual environment generated by the 3D sensing camera can be shared by multiple users (e.g., game players) through one or more server devices (e.g., computer servers). In such embodiments, the server device can also distribute video frames of face portion, game commands and/or 3D locations of each user in a real time manner to user devices operated by the users. Such a new AR game application can be implemented using the methods disclosed herein.

In some embodiments, the AR game application can include, for example, the following key features.

1. Provision of a hybrid reality environment that consists of (i) an AR based environment for a first group of users who are physically located at the substantially same or similar location, where the AR based environment is a real world environment including interactive virtual objects (e.g., 3D AR objects); and (ii) an AV based environment for a second group of users who are physically located at different locations from the first group of users, where the AR based environment is a virtual reality environment including interactive virtual objects. In some embodiments, the AR based environment includes the first group of users as real persons, as well as virtual objects related to (e.g., representing, controlled by, manipulated by, etc.) the second group of users. In some embodiments, the AV based environment includes virtual objects related to (e.g., representing) the first group of users, as well as those virtual objects related to the second group of users.

2. Each user of the hybrid reality environment can interact with each other user through the one or more server devices. In some embodiments, each user from the first group of users can, within the AR based environment, interact with each other user from the first group of users in a face-to-face manner (i.e., the two users are physically at the same location in the real world and interacting with each other); and interact with each virtual object related to the second group of users. On the other hand, each user from the second group of users can control or manipulate a corresponding virtual object related to that user to, within the AV based environment, interact with each virtual object related to the first group of users and the virtual object related to each other user from the second group of users (i.e., the two virtual objects are virtually at the same location in the virtual world and interacting with each other, controlled or manipulated by the corresponding users). In such a way, each user from the first group of users or the second group of users can physically or virtually interact with each other user from the first group of users or the second group of users.

3. In some embodiments, the virtual reality scenes in the AV environment can be generated by provision of a computer generated copy of 3D real world such as, for example, a 3D scanned room, a 3D geographical map application (e.g., Google Earth), sending of live video streaming data of AR scenes generated by the first group of users to the second group users via the server device, and/or the like.

4. In some embodiments, a user from the first group of users physically located in the AR environment can be equipped with, for example, a computer device and/or location sensor to send associated data (e.g., one-dimensional (1D), 2D or 3D data associated with a location, orientation, posture, or movement of that user) to the server device to enable interactions among users in the hybrid reality environment.

5. In some embodiments, a user from the second group of users can be physically located at a location remote from the physical location of the first group of users. The user can use a monitor device (e.g., a computer screen) and an input device (e.g., a mouse, keyboard, remote controller, 3D depth sensor, etc.) to navigate, control, manipulate, etc., a virtual object related to that user. In some embodiments, such a virtual object can be referred to as an avatar of that user.

In some embodiments, hybrid reality is referred to as a mixed reality that encompasses both AR and AV. In some embodiments, hybrid reality refers to the merging of real and virtual worlds to produce new environments and visualizations where physical and digital objects co-exist and interact in real time.

In some embodiments, the structure and function of online hybrid reality environment for multiple users (e.g., players) include the following features.

(1) AR based environment for a first group of users (e.g., primary players) to combine real and virtual objects in a 3D real world.

(2) AV based environment for a second group of users (e.g., secondary players) to combine virtual objects related to the first group of users and virtual objects related to the second group of users in a 3D virtual world.

(3) Each user can interact with other users either in a real world environment (i.e., 3D physical world) or 3D virtual world that is equivalent to physical world.

(4) The virtual objects related to the second group of users can be registered in 3D physical world (real world) coordinates.

(5) The virtual objects related to the first group of users and the virtual objects related to the second group of users can be registered in 3D virtual world coordinates.

In some embodiments, a hybrid reality environments includes (i) an AR based environment for a first group of users that allows interactions between the first group of users and AR objects related to a second group of users through scenes of the AR based environment (e.g., a video camera scene of real world); and (ii) an AV based environment for the second group of users that allows interaction between AR objects related to the first group of users and the second group of users who are watching those interactions in the virtual world that is equivalent to the real world. Specifically, the second group of users can watch scenes of the AV based environment, within which AR objects related to the first group of users and AR objects related to the second group of users co-exist and interact.

In some embodiments, each user from the first group of users is physically located in a real world environment; while each user from the second group of users is located at a remote location different from the location of the first group of users. In some embodiments, the second group of users includes more than one user, and the more than one user from the second group of users can be located at different locations. In some embodiments, both the AR based environment and the AV based environment enable real time interactions among the first group of users and the second group of users through the server device(s) even if they physically reside at different places.

In some embodiments, the AV based environment for the second group of users can be developed using the following methods.

(1) Data of the real world environment (where the first group of users are physically located) is collected at a computer device associated with the first group of users. For example, the real world environment can be scanned by a 3D depth sensor (e.g., 3D CAD room based on 360 degree scanned 3D depth sensing). Such a 3D scanned room can provide an equivalence of the "real world" environment in terms of 3D geometric field. Further details are shown and described below with respect to FIGS. 7A-7C.

(2) In some embodiments, 3D geographic map software such as, for example, Google Earth or NASA World Winds can be used to provide a virtual 3D environment that is equivalent to the real world based on the 3D position on earth (i.e., latitude, longitude and altitude). Further details are shown and described below with respect to FIGS. 9A-9E.

(3) In some embodiments, real time streaming of video image of AR scenes generated by computer devices associated with the first group of users can be sent to the computer device of the second group of users. In such embodiments, a user from the second group of users can, for example, watch live video scenes of the AV based environment to recognize the interaction among all the users, and/or to control the interaction between that user and the other users. Further details are shown and described below with respect to FIGS. 8A-8F.

The hybrid reality application is different from the conventional AR application in a few ways. For a conventional AR application, for example, a computing device including a video camera is provided to take images of an AR maker that may be a printout or made out of a material and is disposed on a physical surface (e.g., a table). In some embodiments, such an execution of the conventional AR application, refers to a system in which a user views and acts within an enhanced version of the real world. Such enhancements are virtual and can include 2D/3D computer generated objects or information. On the contrary, a hybrid reality refers to a system that combines real and virtual objects, where users can interact with real and virtual objects in such a mixed reality environment.

FIG. 1 is a schematic diagram illustrating a system 100 configured to generate a hybrid reality environment in accordance with some embodiments. As shown in FIG. 1, the system 100 includes a server device 14 and two user devices 12 and 16. The server device 14 is operatively coupled to and communicates with the user devices 12, 16 via two networks 13 and 15. Although not shown in FIG. 1, each user device 12, 16 can be accessed and operated by one or more users. The server device 14 and the user devices 12, 16 of the system 100 are configured to collectively perform a task of generating a hybrid reality environment of real and virtual objects, and presenting scenes of such a hybrid reality environment to user(s) of the user devices 12, 16.

Although shown in FIG. 1 as including a single server device and two user devices, in other embodiments, a system configured to generate a hybrid reality environment and present scenes of the hybrid reality environment can include any number of server devices and/or any number of user devices. Each server device included in such a system can be identical or similar to the server device 14, and each user device included in such a system can be identical or similar to the user device 12 or 16. For example, more than two user devices can be operatively coupled to and communicate with one or more server devices such that each user device from the more than two user devices can be operated by a user; the user devices and the server device(s) can be collectively configured to generate scenes of a hybrid reality environment; and each user device can be configured to present corresponding scene(s) of the hybrid reality environment to the user operating that user device.

The networks 13 and 15 can be any type of network configured to operatively couple one or more server devices (e.g., the server device 14) to one or more user devices (e.g., the user devices 12, 16), and enable communications between the server device(s) and the user device(s). In some embodiments, the networks 13, 15 can include one or more networks such as, for example, a cellular network, a satellite network, a local area network (LAN), a wide area network (WAN), a wireless local area network (WLAN), etc. In some embodiments, the networks 13, 15 can include the Internet. Furthermore, the networks 13, 15 can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), bluetooth, Wi-Fi, voice over internet protocol (VoIP), Wi-MAX, etc. Additionally, although shown in FIG. 1 as the system 100 including two networks, in other embodiments, user device(s) and server device(s) of such a system can be operatively connected by a single network or any number of networks.

The server device 14 can be any type of device configured to function as a server-side device of the system 100. Specifically, the server device 14 is configured to communicate with one or more user devices (e.g., the user devices 12, 16) via the networks 13, 15; receive data of the user(s) and a background environment provided by the user device(s); process the received data to generate scenes of the hybrid reality environment; and send signals to the user device(s) such that those scenes are displayed to the user(s) at the user device(s). In some embodiments, the server device 14 can be, for example, a background server, a back end server, a database server, a workstation, a desktop computer, a cloud computing server, a data processing server, and/or the like. In some embodiments, the server device 14 can be a server cluster or server center consisting of two or more servers (e.g., a data processing server and a database server). In some embodiments, the server device 14 can be referred to as, for example, an AR server.

In some embodiments, the server device 14 can include a database that is configured to store AR content (e.g., 3D AR objects) and other data and/or information associated with AR content. In some embodiments, a server device (or an AR server, e.g., the server device 14) can be any type of device configured to store AR content and accessible to one or more user devices (e.g., the user devices 12, 16). In such embodiments, the server device can be accessed by a user device via one or more wired and/or wireless networks (e.g., the networks 13, 15) or locally (i.e., not via a network). Furthermore, in some instances, the server device can be accessed by a user device in an ad-hoc manner such as, for example, home Wi-Fi, NFC (near field communication), Bluetooth, infrared radio frequency, in-car connectivity, and/or the like.

The user devices 12, 16 can be any type of computer device configured to function as a client-side device of the system 100. Specifically, each of the user devices 12, 16 is configured to communicate with one or more server device(s) (e.g., the server device 14) via the networks 13, 15; collect and send to the server device 14 data of the user(s) and the background environment; receive signals from the server device 14; and display scenes of the hybrid reality environment to the user(s) based on the received signals. In some embodiments, the user devices 12, 16 can be, for example, a cellular phone, a smart phone, a mobile Internet device (MID), a personal digital assistant (PDA), a tablet computer, an e-book reader, a laptop computer, a handheld computer, a desktop computer, a wearable device, and/or any other personal computer device. In some embodiments, a user device can also be, for example, a mobile device, a client device, an electronic device, a terminal, a portable device, an AR device, and/or the like.

Additionally, a user operating the user device 12 or 16 can be any person (potentially) interested in generating and viewing scenes of the hybrid reality environment. Such a person can be, for example, a gamer, a communication agent, an instructor, a student, a trainer, a trainee, a designer, or anyone who is interested in communicating and interacting with others in a hybrid reality environment.

Figure 2A:
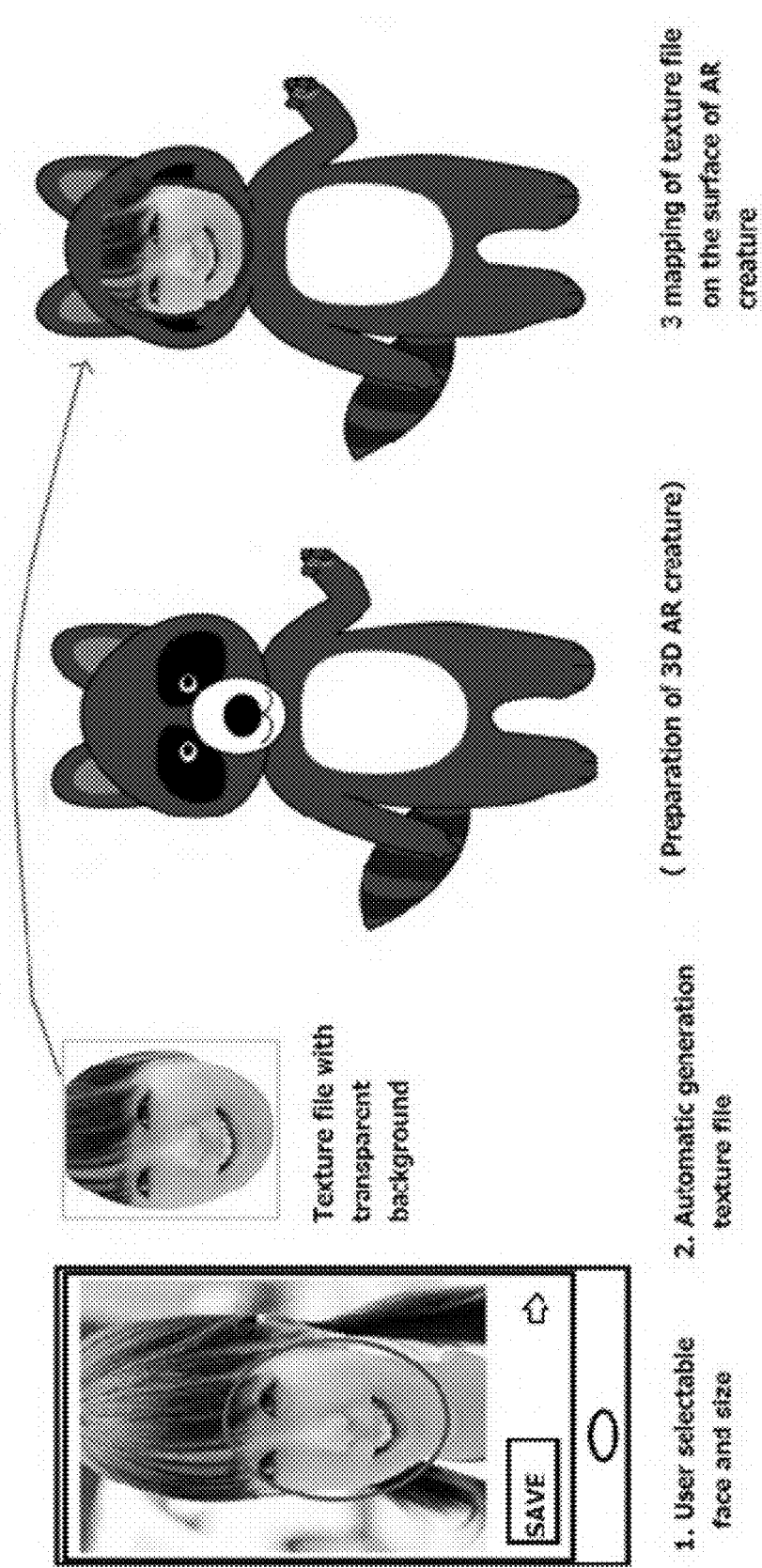
FIG. 2A is a schematic illustration of generating a 3D AR creature having a still image of human face on a surface of an AR object in accordance with some embodiments.
Figure 2B:
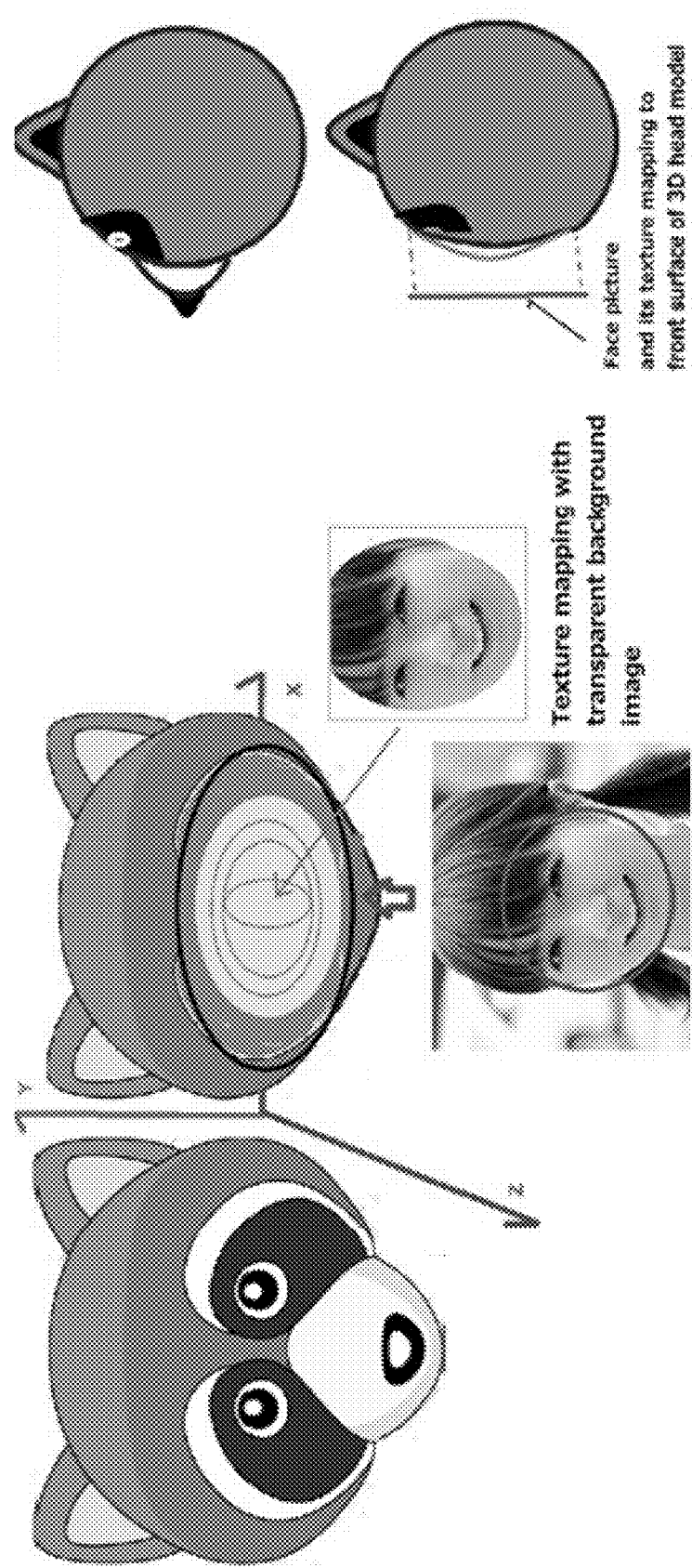
FIG. 2B is a schematic illustration of mapping a still picture based video image onto a 3D surface of an AR object in accordance with some embodiments.

FIGS. 2A-6B illustrate preparation for generating a hybrid reality environment. Specifically, FIG. 2A is a schematic illustration of generating a 3D AR creature having a still image of human face on a surface of an AR object in accordance with some embodiments. FIG. 2B is a schematic illustration of mapping a still picture based video image onto a 3D surface of an AR object in accordance with some embodiments. FIGS. 2A and 2B collectively depict the mapping of a still picture image of a human face onto the surface of an AR object. Such an implementation of mapping includes: (1) the user takes a picture of his/her own face using, for example, a front camera of a smart phone (as shown in FIG. 2A), or selects a still picture saved in a picture gallery of a smart phone, and the user then selects the face region, as shown in step 1 of FIG. 2A; (2) the application program automatically generates a picture file of the face region as a foreground with transparent background, as shown in step 2 of FIG. 2A and the left figure in FIG. 2B; (3) the picture file is mapped as a texture onto the surface of the 3D AR object, as shown in step 3 of FIG. 2A and the right figure in FIG. 2B.

Figure 2E:
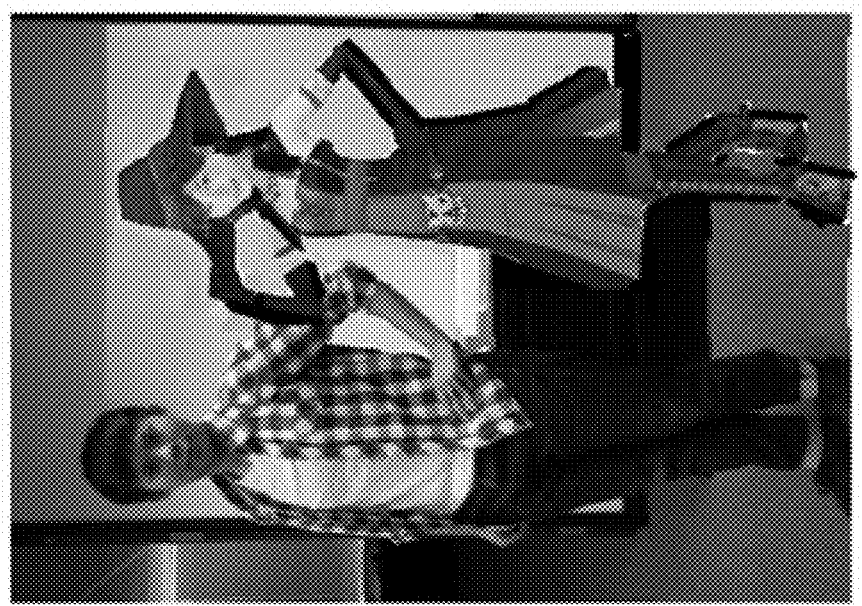
FIG. 2E is a schematic illustration of an AR scene including a real person and an animated AR object of FIG. 2D.
Figure 2D:
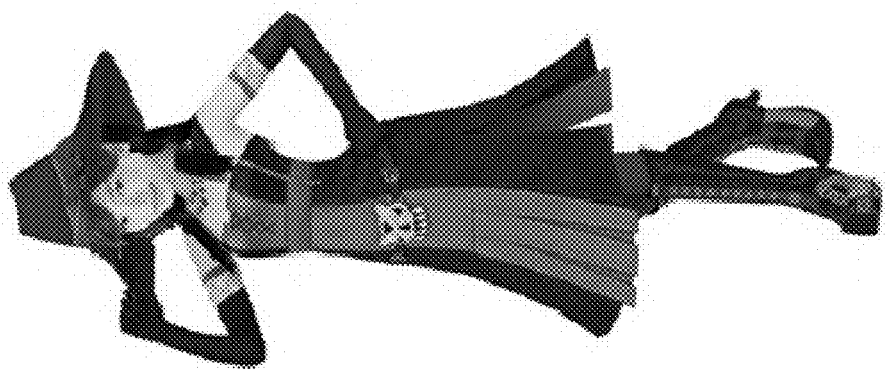
FIG. 2D is a schematic illustration of mapping a photo based face image onto the AR model in FIG. 2C.
Figure 2C:
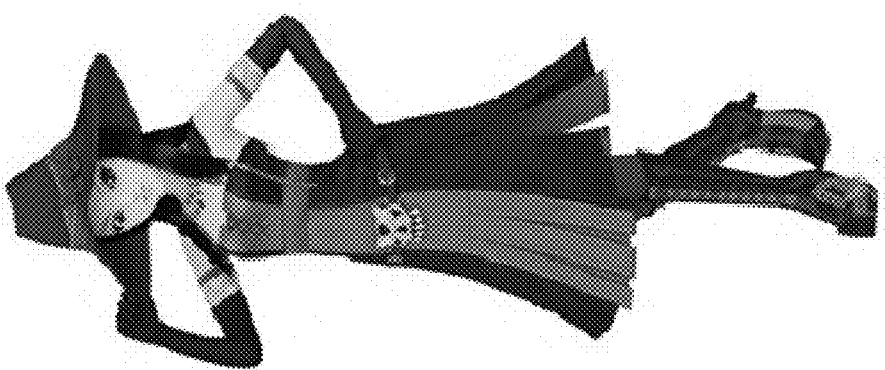
FIG. 2C is a schematic illustration of an AR model without photograph mapping of human face in accordance with some embodiments.

FIG. 2C is a schematic illustration of an AR model without photograph mapping of human face in accordance with some embodiments. FIG. 2D is a schematic illustration of mapping a photo based face image onto the AR model in FIG. 2C. In other words, FIG. 2C depicts an original 3D AR human body without any texture mapping of video or image data based face, and FIG. 2D depicts the AR body after a video frame based face texture file is mapped onto the surface of the AR body in FIG. 2C.

FIG. 2E is a schematic illustration of an AR scene including a real person and an animated AR object of FIG. 2D. Such an AR scene is a scene of a AR based environment that includes a first user as a real person (e.g., the male user on the left of the scene in FIG. 2E) and a virtual object related to a second user (e.g., the female user whose face is mapped onto the AR object on the right of the scene in FIG. 2E). Similarly stated, FIG. 2E depicts the AR picture generated in FIG. 2D that includes an AR body with human face, as well as a real person, in the real world. In some embodiments, the AR body in FIG. 2D can be modified to make, for example, a pre-defined animation. In such embodiments, a user can use an animated AR creature to generate an AR video clip. In some embodiments, such a still picture based texture mapping to 3D AR body can be expanded to a whole body of an AR creature.

Figures 3A, 3B, 3C:
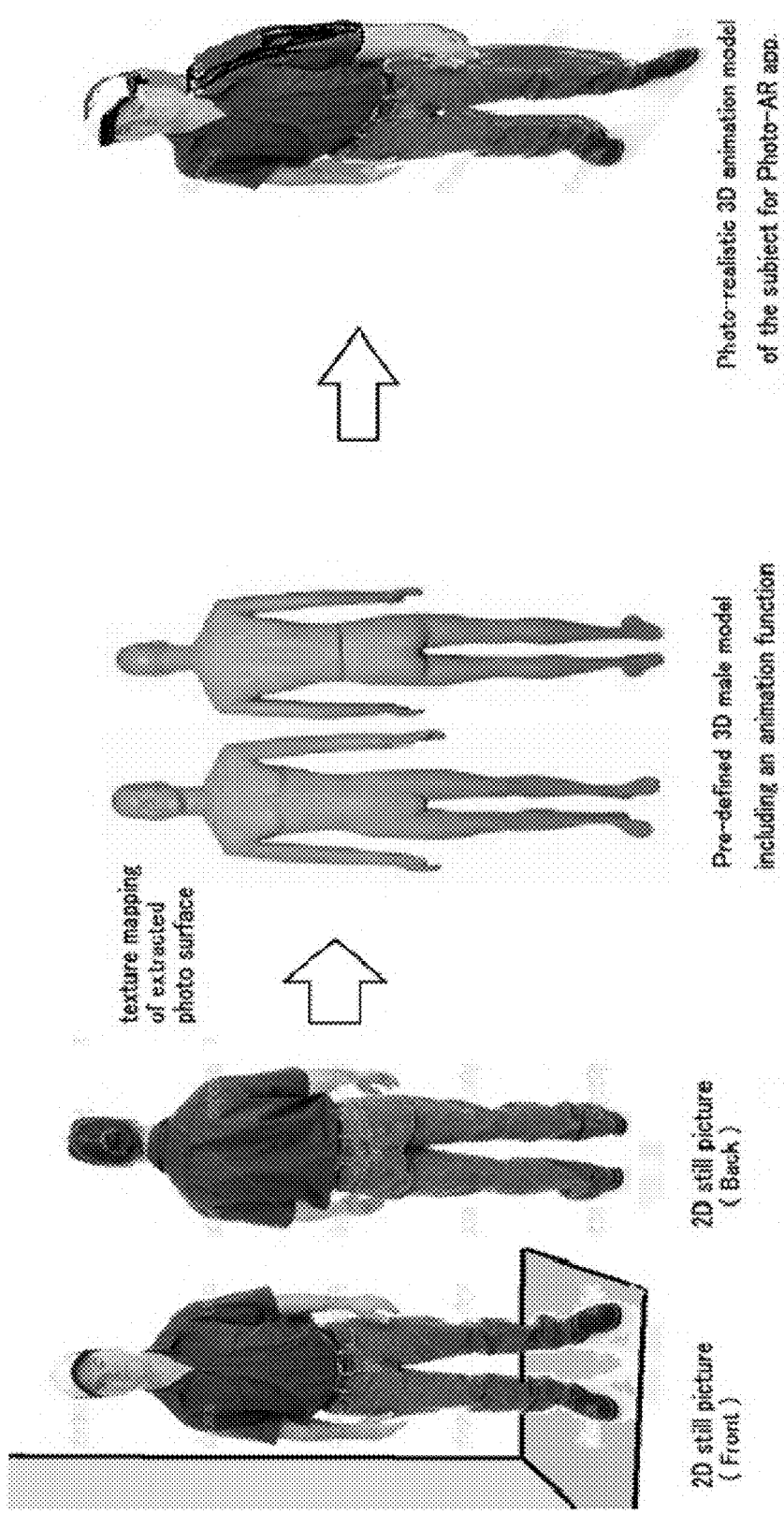
FIG. 3A is a schematic illustration of still pictures of a real person in accordance with some embodiments.
FIG. 3B is a schematic illustration of a 3D AR object in accordance with some embodiments.
FIG. 3C is a schematic illustration of mapping the still pictures of FIG. 3A onto the 3D AR object of FIG. 3B.

FIG. 3A is a schematic illustration of still pictures of a real person in accordance with some embodiments. That is, FIG. 3A depicts 2D still picture shots of both a front view and a back view of a real person as a subject. FIG. 3B is a schematic illustration of a 3D AR object in accordance with some embodiments. FIG. 3C is a schematic illustration of mapping the still pictures of FIG. 3A onto the 3D AR object of FIG. 3B. Overall, FIGS. 3A-3C depict a mapping of the front view picture of FIG. 3A onto a front surface of the 3D AR object of FIG. 3B, and a mapping of the back view picture of FIG. 3A onto a back surface of that 3D AR object of FIG. 3B. As a result of such mappings, a photo-realistic 3D avatar model of the subject, which can be used for photo AR applications, is shown in FIG. 3C.

FIG. 4A is a schematic illustration of collecting 3D depth data of a subject (i.e., a real person) in real time in accordance with some embodiments. To be specific, FIG. 4A depicts the determination of 3D coordinates of the subject by, for example, a mobile device with a 3D depth sensor. In some embodiments, using real time depth sensing data (i.e., Z axis data) and conventional 2D pixel data (i.e., X-Y axis data) collected from, for example, a video camera, the AR application can be developed to realize a real time interaction of the real person as the subject and a virtual AR object in scenes of the AR based environment (e.g., video camera scenes of the AR based environment).

FIG. 4B is a schematic illustration of measuring a distance between the subject in FIG. 4A and a 3D AR object in a scene of an AR based environment in accordance with some embodiments. Specifically, FIG. 4B depicts a scene of the AR based environment captured in a computer device (e.g., a smart phone), where the scene displays the subject (i.e., the real person) and the 3D based AR object (i.e., a tiger). Furthermore, 3D coordinates of the real person's body and 3D coordinates of the AR tiger in the scene can be computed and compared with (predefined) threshold values to activate pre-defined animation behavior of the AR tiger. FIG. 4C is a schematic illustration of an interaction between the real person and the 3D AR object in the AR based environment of FIG. 4B. As shown in FIG. 4C, the AR tiger interacts with the real person by pre-defined animation when the distance between the real person and the AR tiger is less than a (predefined) threshold value.

Figure 4D:
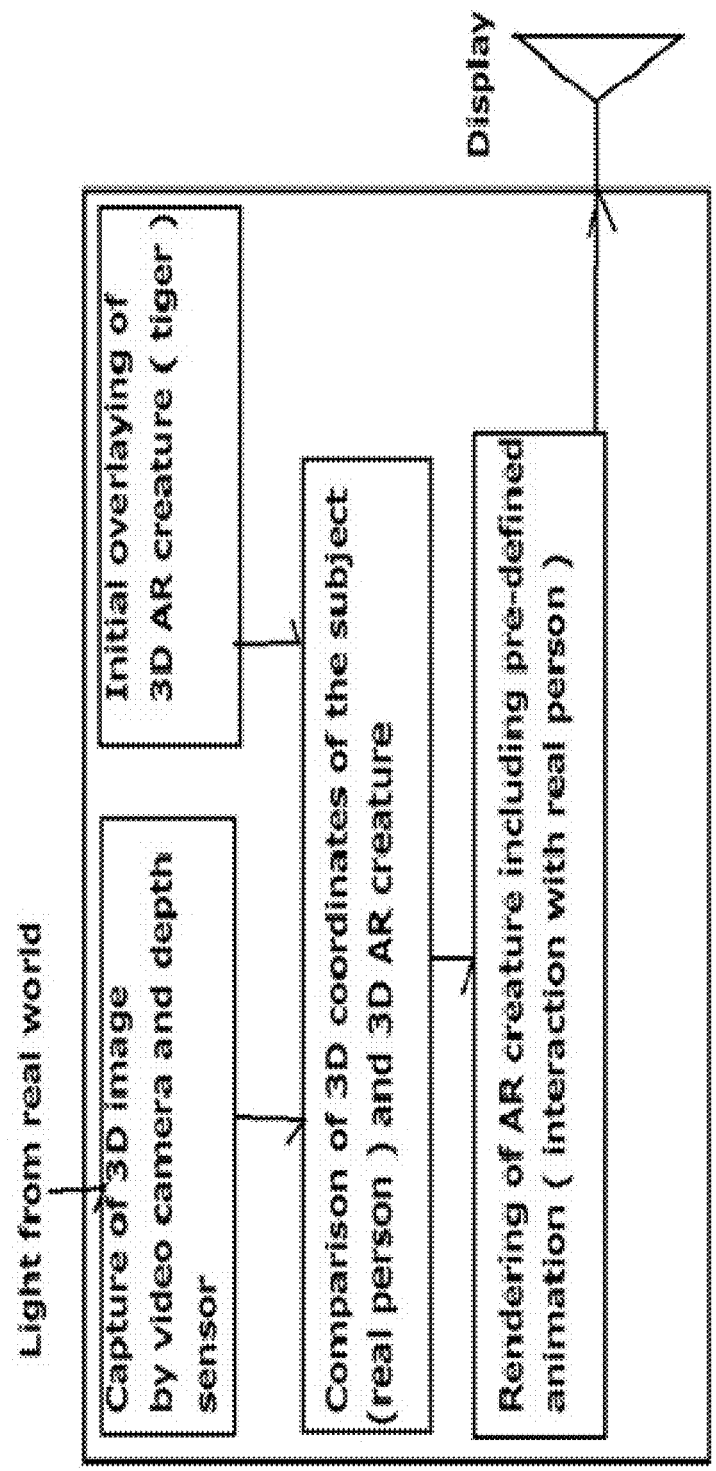
FIG. 4D is a block diagram illustrating functions performed by an AR application in connection with the schematic illustrations of FIGS. 4A-4C.

FIG. 4D is a block diagram illustrating functions performed by an AR application in connection with the schematic illustrations of FIGS. 4A-4C. Instructions for such an AR application can be stored in a memory of a computer device (e.g., a mobile device, a smart phone, etc.) of a user, and performed by a processor of that computer device. As shown in FIG. 4D, a 3D video camera installed at the computer device (e.g., at a rear side of a mobile device) can be used to capture the light from the subject (i.e., the real person), and convert, in a real-time manner, collected raw data into 3D location data in accordance with the coordinate system of set at the computer device. The AR application can also overlay the 3D AR creature (i.e., the AR tiger) in a scene of the AR based environment (e.g., a camera view scene). The AR application can compute an estimated distance between the real person's body and the AR creature, and then activate the pre-defined animation of the AR creature if the estimated distance is less than a threshold value. As a result of the pre-defined animation being activated, the still scene is changed to a moving scene as if the AR creature is interacting with the real person, as shown in FIG. 4C.

Figure 5B:
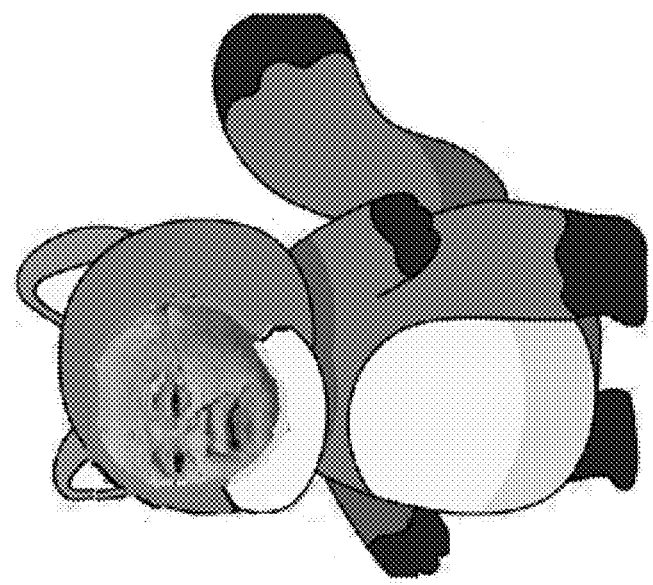
FIG. 5B is a schematic illustration of the animated AR object as a result of the mapping of FIG. 5A.
Figure 5A:
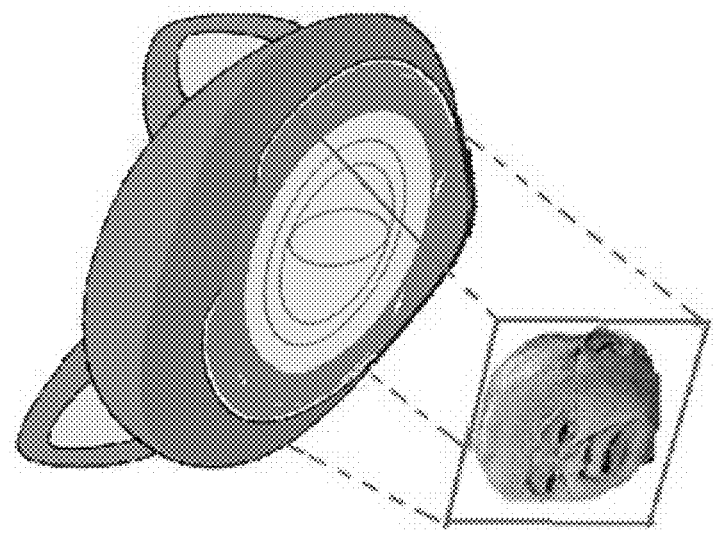
FIG. 5A is a schematic illustration of mapping a video onto a surface of a 3D AR object in accordance with some embodiments.
Figure 5A:
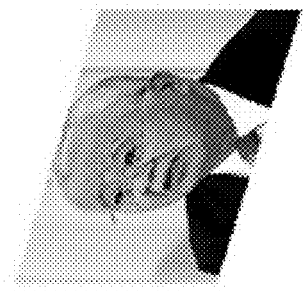

FIG. 5A is a schematic illustration of mapping a video onto a surface of a 3D AR object in accordance with some embodiments. FIG. 5B is a schematic illustration of the animated AR object as a result of the mapping of FIG. 5A. FIGS. 5A and 5B collectively depict the mapping of a pre-recorded video file that has a portion of human face as a forward image with transparent background onto a 3D AR object. In some embodiments, the video clip file itself can be mapped onto a surface of a head of the AR object. In such embodiments, by using this mapping method the resulted AR creature can display a loop of video playing such as continuous laughing expressions.

Figure 5C:
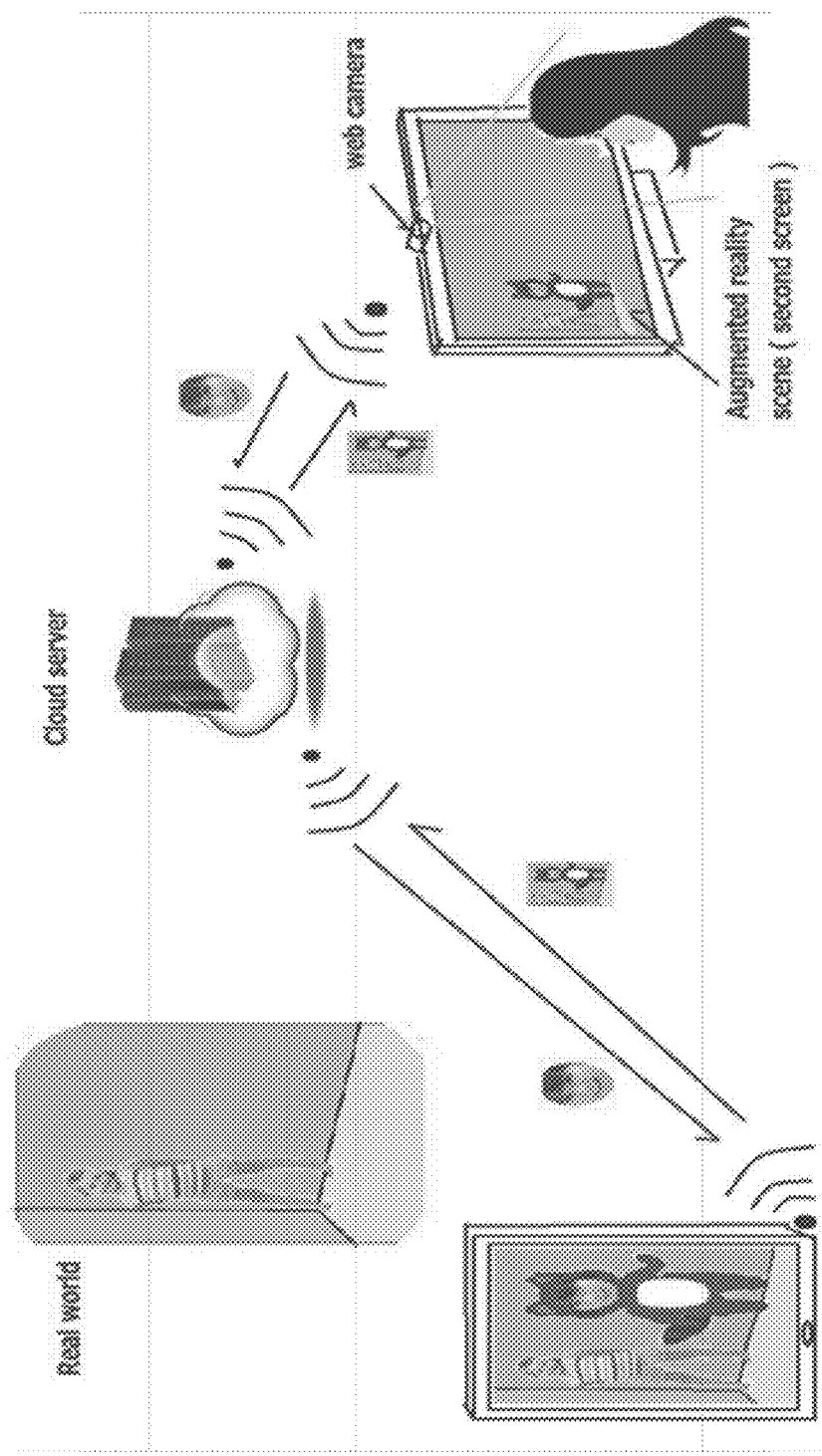
FIG. 5C is a schematic illustration of providing AR scenes to multiple users in accordance with some embodiments.

FIG. 5C is a schematic illustration of providing AR scenes to multiple users in accordance with some embodiments. Specifically, FIG. 5C depicts a real-time streaming of video based face data (e.g., of the female user sitting in front of a screen shown in the bottom right corner of FIG. 5C) and its sharing with other users (e.g., the female user standing in a corner shown in the top left corner of FIG. 5C) through a server device (e.g., the cloud server in FIG. 5C).

As shown in FIG. 5C, the female user sitting in front of the screen uses a web camera attached to the screen to capture a picture or a video clip of her face. She then uses a computer device (e.g., a computer attached to or including the screen) to send the captured picture or video clip to the server device, which then broadcasts the picture of video clip of the user's face to computer devices of other users. The female user standing at the corner then receives the picture of video clip using a computer device (e.g., a smart phone). The female user standing at the corner also uses her computer device to capture a picture of video clip of her standing at the corner.

In some embodiments, as shown in FIG. 5C, the female user standing at the corner can use her computer device to map the received face picture or video clip onto an AR object (e.g., a cartoon bear as shown in FIG. 5C) to generate an animated AR creature, and then to combine the animated AR creature with the picture or video clip of her standing at the corner to generate a scene (e.g., a picture of a video clip) of the AR based environment. Such an AR based environment includes the female user standing at the corner in the real world, and a virtual object (i.e., the animated AR creature). The scene of the AR based environment is shown at the bottom left corner of FIG. 5C. The computer device sends the scene to the server device, which then broadcasts the scene to computer devices of other users. Thus, the female user sitting in front of the screen can watch the scene (as a picture of video clip) via the screen, as shown in the bottom right corner of FIG. 5C.

In some other embodiments, although not shown in FIG. 5C, the female user standing at the corner can use her computer device to send the picture or video clip of her standing at the corner (shown at the top left corner of FIG. 5C) to the server device without combining the picture of video clip with another AR object. The server device can map the face picture or video clip (which is received from the female user sitting in front of the screen) onto an AR object (e.g., a cartoon bear as shown in FIG. 5C) to generate an animated AR creature, and then combine the animated AR creature with the picture or video clip of the female user standing at the corner to generate a scene (e.g., a picture of a video clip) of the AR based environment. Such an AR based environment includes the female user standing at the corner in the real world, and a virtual object (i.e., the animated AR creature). The scene of the AR based environment is then broadcasted from the server device to computer devices of the users, including the computer device of the female user standing at the corner, and the computer device of the female user sitting in front of the screen. Thus, the female user standing at the corner can watch the scene (as a picture of video clip) via her computer device (e.g., a mobile device, a smart phone), as shown in the bottom left corner of FIG. 5C. Similarly, the female user sitting in front of the screen can watch the scene (as a picture of video clip) via the screen, as shown in the bottom right corner of FIG. 5C.

Additionally, in some embodiments, the female user standing at the corner can use her computer device to capture and send live video streaming data of scenes of the AR based environment to computer devices of other users via the server device. The live video streaming data of scenes can include live video streaming data of the female user herself as well as the background environment surrounding her, as shown in FIG. 5C.

Figure 6A:
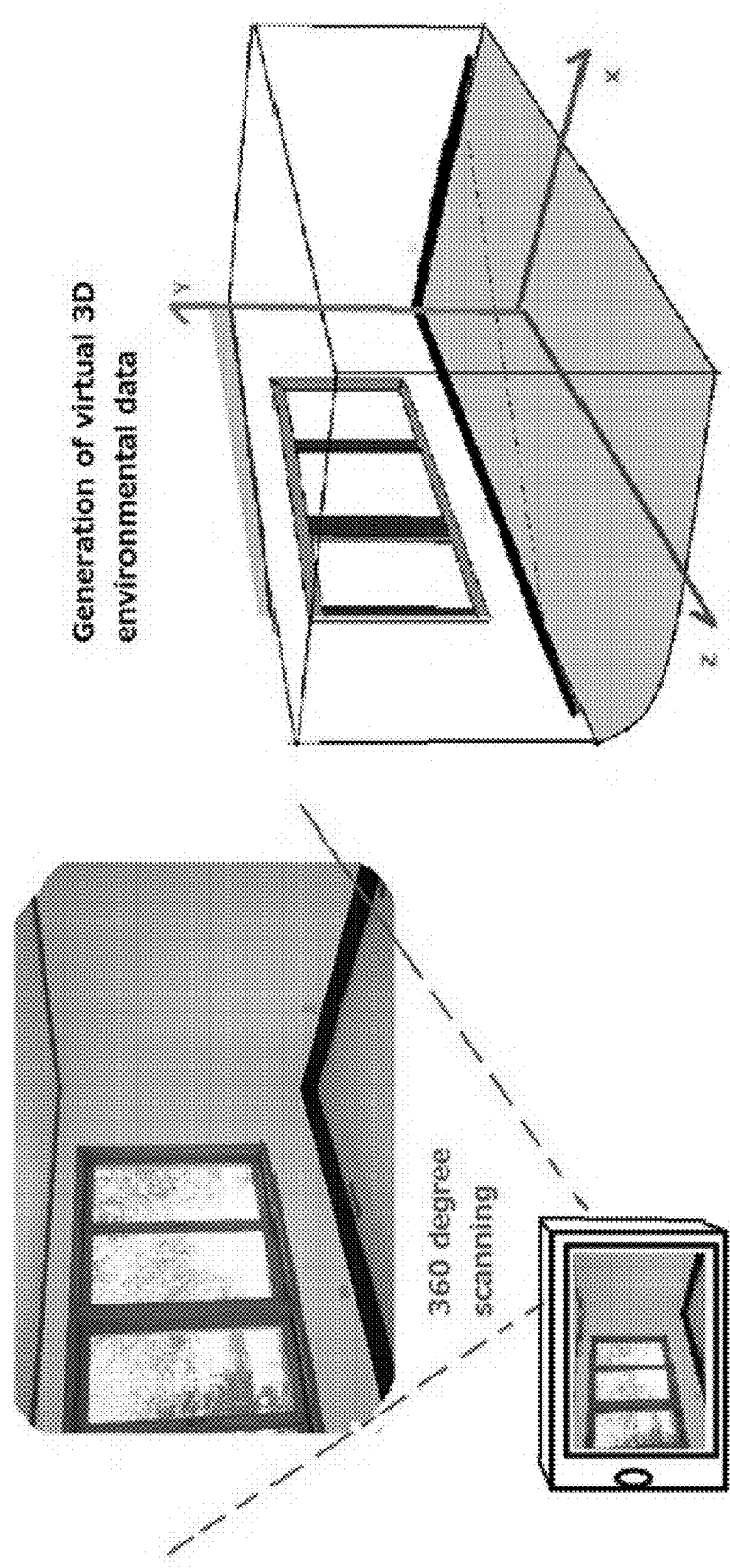
FIG. 6A is a schematic illustration of collecting data of a real world scene in accordance with some embodiments.

FIG. 6A is a schematic illustration of collecting data of a real world scene in accordance with some embodiments. Specifically, FIG. 6A depicts that a user can use a computer device (e.g., a mobile device) to generate 3D virtual environment data by, for example, a 360-degree scanning of the surrounding area using a 3D depth senor and/or a conventional video camera of the computer device. In some embodiments, data acquisition of 3D geometric data of a background environment with video texture can be used to generate a 3D virtual environment data file for, for example, multiplayer AR gaming applications.

Figure 6B:
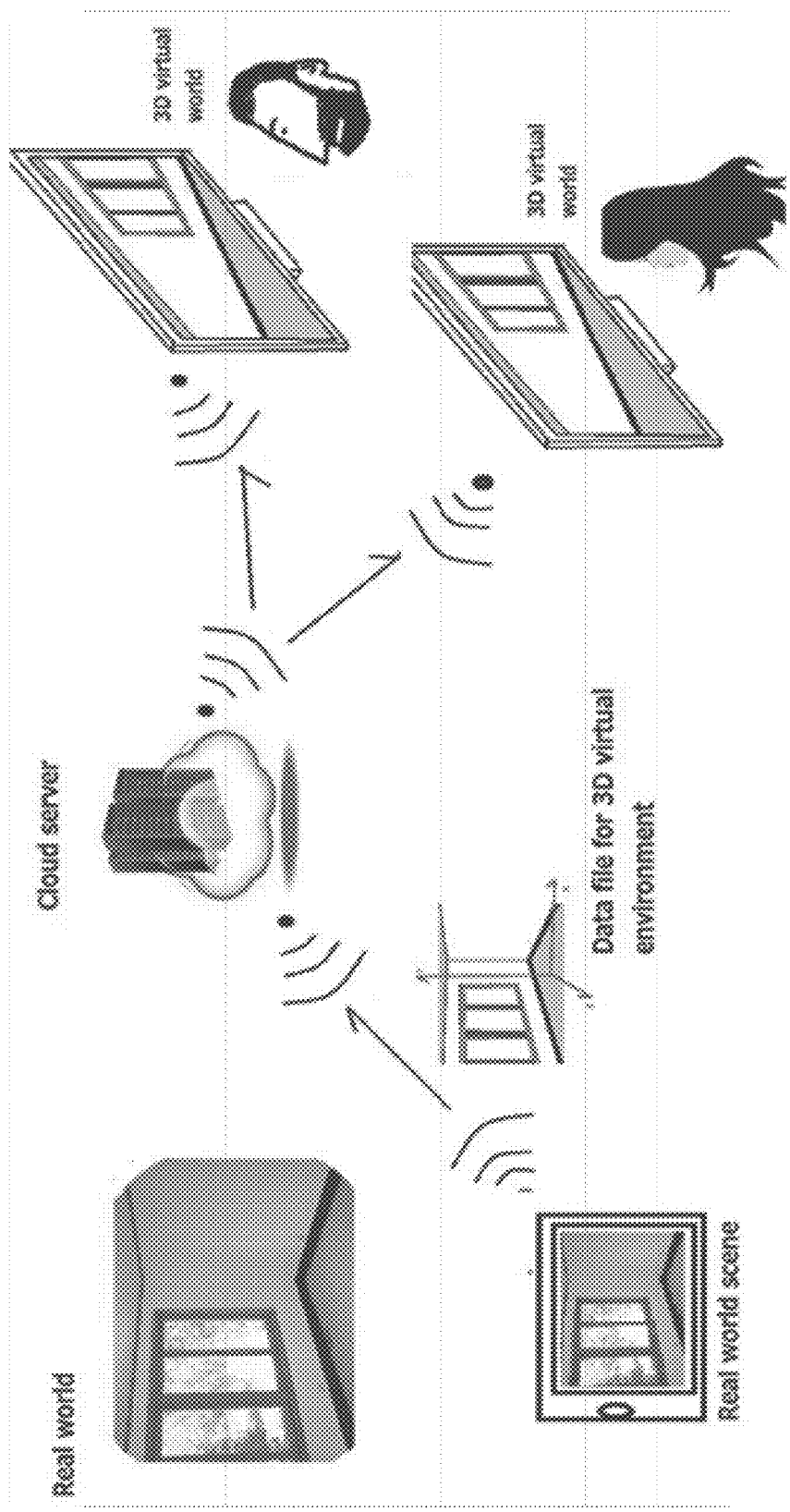
FIG. 6B is a schematic illustration of providing to multiple users a 3D virtual scene of the real world scene of FIG. 6A.

FIG. 6B is a schematic illustration of providing to multiple users a 3D virtual scene of the real world scene of FIG. 6A. Specifically, FIG. 6B depicts the sharing of a 3D virtual environment to multiple users through a server device (e.g., the cloud server in FIG. 6B). In FIG. 6B, a user (not shown in FIG. 6B) uses a computer device (e.g., a mobile device, a smart phone) to generate a data file of a 3D virtual environment by, for example, a 360-degree scanning of his/her room using a 3D depth sensor. This data file can be sent to the server device and then shared by multiple users through the server device, as shown in FIG. 6B. In this case, the user taking the picture or video is watching the picture or video of his/her room in the real world via the screen of his/her computer device, as shown on the left part of FIG. 6B. All other users are watching the 3D virtual room (as a picture of video), which is visually and geometrically identical to the room in real world, via their computer devices, as shown on the right part of FIG. 6B.

Figure 7A:
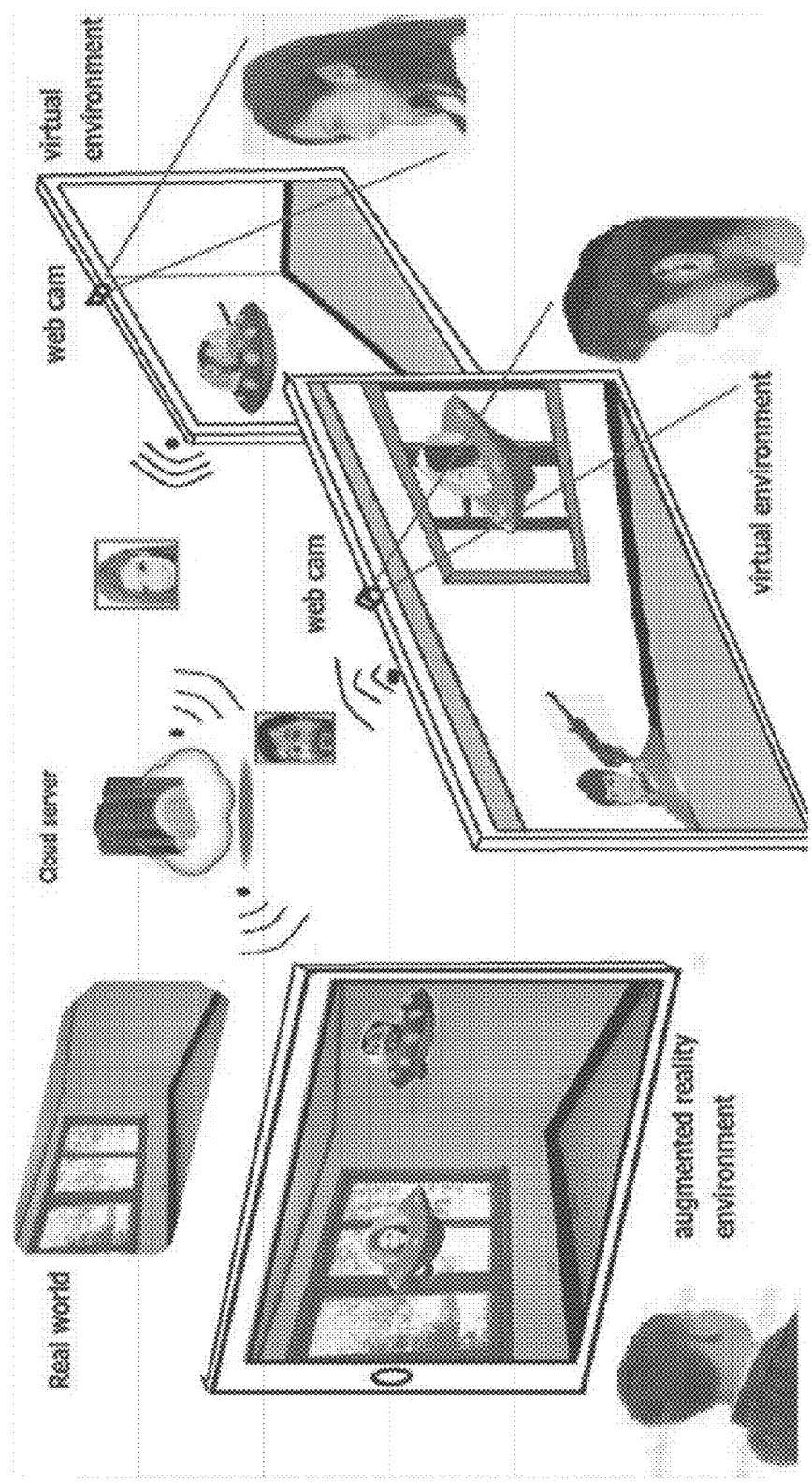
FIG. 7A is a schematic illustration of an AR gaming environment in accordance with some embodiments.

FIG. 7A is a schematic illustration of an AR gaming environment in accordance with some embodiments. Specifically, FIG. 7A depicts an AR gaming environment that provides video streaming of faces for individual users except a primary user that is shown on the bottom left corner of FIG. 7A. In FIG. 7A, the primary user can watch a video camera scene including AR flying vehicles related to other users. Each flying vehicle related to a user except the primary user has a virtual pilot that has a video streaming based human face of that user. Therefore, all users can interactively communicate each other by watching each face except for the primary user's face. All users except the primary user can watch the 3D virtual room that is generated and sent from a computer device (e.g., a mobile device) of the primary user. The primary user cannot send his/her video streaming based face, because he/she is using a rear video camera of the computer device he/she operates, which is assumed to have no front video camera. Thus, the face of pilot corresponding to the primary user is a virtual face, as shown in FIG. 7A.

Figure 7B:
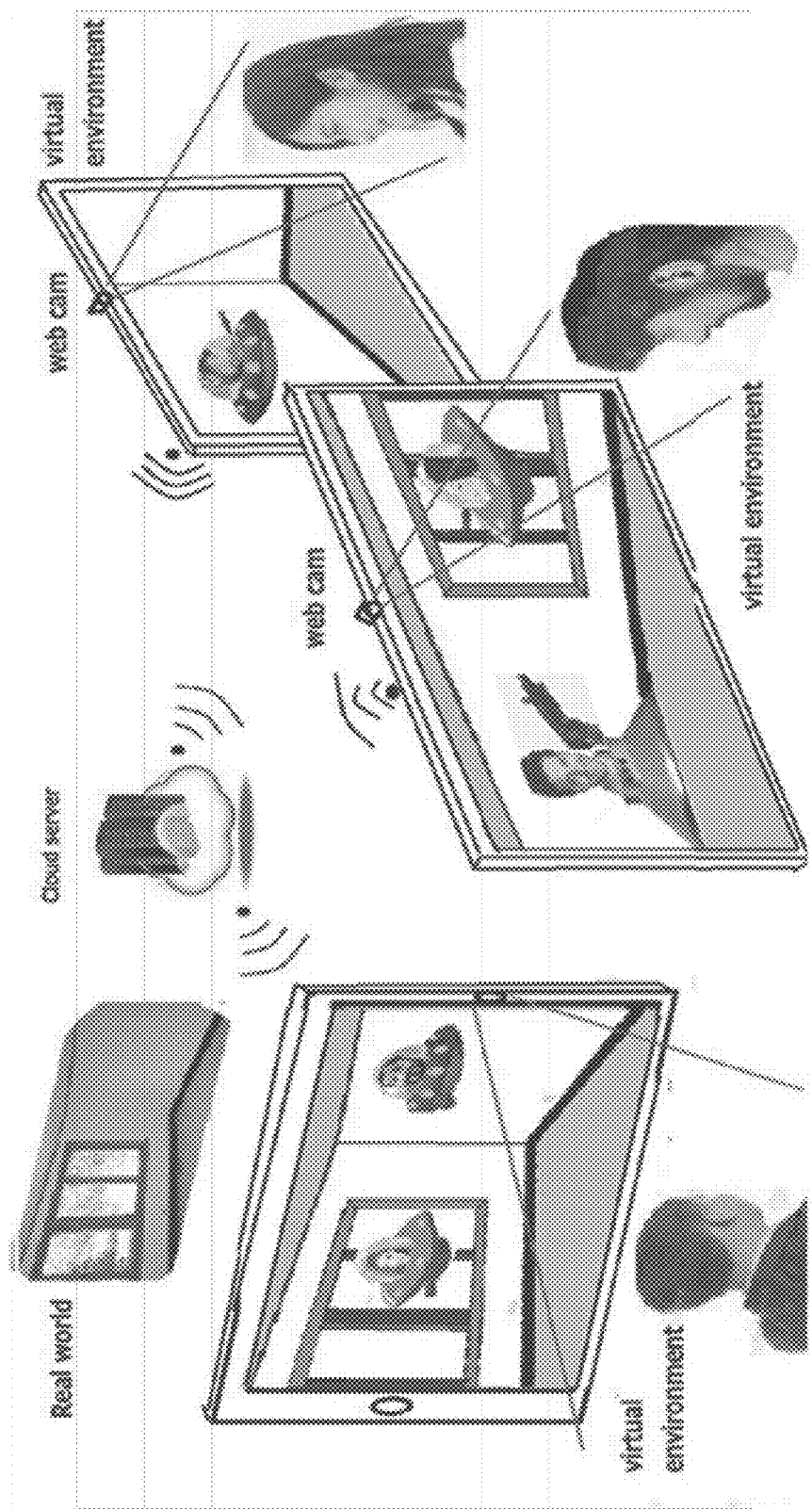
FIG. 7B is a schematic illustration of another AR gaming environment in accordance with some embodiments.

FIG. 7B is a schematic illustration of another AR gaming environment in accordance with some embodiments. Specifically, FIG. 7B depicts an AR gaming environment that provides video streaming of all users. In this scenario, the primary user (the one shown at the bottom left corner of FIG. 7B) uses a front video camera to capture a video of his/her face. Therefore, the primary user can send the real video streaming data of his/her face to other users.

As shown in FIGS. 7A and 7B, the primary user is physically at the room in the real world, which is set as the "battle field" for the game. The primary user uses his/her computer device to capture data of himself/herself (e.g., face data as shown in FIG. 7B), as well as data of the surrounding or background environment of the room. In some embodiments, the captured data of the primary user can include data associated with, for example, a location, orientation, posture, or movement of the primary user. In some embodiments, the captured data of the primary user can include, for example, 3D data associated with the primary user. Such 3D data can include, for example, data associated with computer generated 3D geographic map enhanced by texture mapping of earth satellite image. The computer device operated by the primary user can then send the captured data of the primary user and/or the background environment to the server device (e.g., a cloud server). In some embodiments, more than one primary user can be physically located at the room, and each of them is subjected to the same operations and procedures described herein.

Each non-primary user is located at a location different from the primary user (i.e., not at the room). In some embodiments, as shown in FIGS. 7A and 7B, the non-primary users include more than one user, and at least two non-primary users are located at two different locations. Similar to the primary user, each non-primary user uses his/her computer device to capture data of himself/herself. In some embodiments, the captured data of a non-primary user includes, for example, face image data of that non-primary user. In such embodiments, the face image data of the non-primary user can include, for example, real-time video and audio data packets including extracted image data of that non-primary user's face, which is captured by a video camera of a computer device operated by that non-primary user. The computer device operated by each non-primary user can then send the captured data of that non-primary user to the server device (e.g., a cloud server).

Upon receiving the capture data from the computer devices of the primary and non-primary users, the server device can generate a scene of an AR based environment for each primary user. The AR based environment includes the primary user as a real person in the real world, as well as virtual objects (e.g., AR flying vehicles) related to the non-primary users. The virtual objects related to the non-primary users are generated at the server device based on the captured data of the non-primary users. The virtual objects related to the non-primary users are controlled, navigated or manipulated, and used to represent or identify the non-primary users. In some embodiments, the server device can generate the scene of the AR based environment for displaying a movement of a virtual object related to a non-primary user, wherein such a movement is controlled by that non-primary user in real time.

The server device can then send the generated scene of the AR based environment (e.g., via signals) to the computer device of the primary user, such that the computer device of the primary user displays the scene to the primary user. As a result, the primary user can see the virtual objects related to other users, and thus interact with those virtual objects in real time within the AR based environment. In some embodiments, the scene of the AR based environment displayed to the primary user does not include a virtual object or any other type of representation related to the primary user. For example, as shown in the left part of FIGS. 7A and 7B, the primary user does not see himself/herself or any virtual object related to him/her in the scene displayed to him/her on his/her computer device.

In some embodiments, although not seeing the virtual object related to the primary user, the primary user can control, navigate or manipulate his/her virtual object in the virtual world by making a movement, a gesture, or any other type of action in the real world. For example, the primary user can move his position within the room so that the relative location of his/her virtual object with respect to the virtual objects related to the non-primary users in the virtual world is changed accordingly. For another example, the primary user can make a gesture to indicate an intended action (e.g., attack, defense, communicate, etc.) in the game. As a result, his/her virtual object is triggered to perform the corresponding action accordingly.

Similarly, the server device can generate a scene of an AV based environment for each non-primary user. The AV based environment includes the virtual objects (e.g., AR flying vehicles) related to the non-primary users and a virtual object related to the primary user. The virtual object related to the primary user is generated at the server device based on the captured data of the primary user such as his/her location, movement, gesture, face, etc. In some embodiments, the AV based environment is a virtualized realization of the AR based environment. In some embodiments, the server device can generate the scene for displaying a movement of a virtual object related to the primary user that corresponds to a movement of the primary user in real time. In some embodiments, the server device can generate a virtual object related to a non-primary user or the primary user by, for example, mapping a picture of that user onto a surface of an AR object associated with that user. For example, as shown in FIGS. 7A and 7B, the server device can map a picture of video clip of a user (e.g., the primary user or a non-primary user) onto an AR flying vehicle to generate an animated AR creature for that user.

The server device can then send the generated scene of the AV based environment (e.g., via signals) to the computer device of a non-primary user, such that the computer device of that non-primary user displays the scene to that non-primary user. As a result, the non-primary user can see the virtual objects related to other users, and thus interact with those virtual objects in real time within the AV based environment. In some embodiments, the scene of the AV based environment displayed to a non-primary user does not include a virtual object or any other type of representation related to that non-primary user. For example, as shown in the right part of FIGS. 7A and 7B, each of the two non-primary users does not see himself or herself or any virtual object related to him or her in the corresponding scene displayed to him or her on the screen.

In some embodiments, although not seeing her virtual object, a non-primary user can control, navigate or manipulate her virtual object in the virtual world by control, navigate or manipulate an input means of her computer device. Such an input means can include, for example, a mouse, a keyboard, a microphone, a web camera, a joystick, and/or the like. For example, a non-primary user can navigate her AR flying vehicle in the virtual world by manipulating a joystick. For another example, a non-primary user can send command (e.g., attack, fire, defense, etc.) to her AR flying vehicle by using a mouse and/or a keyboard, such that her AR flying vehicle can take a corresponding action in the virtual world.

Figure 7C:
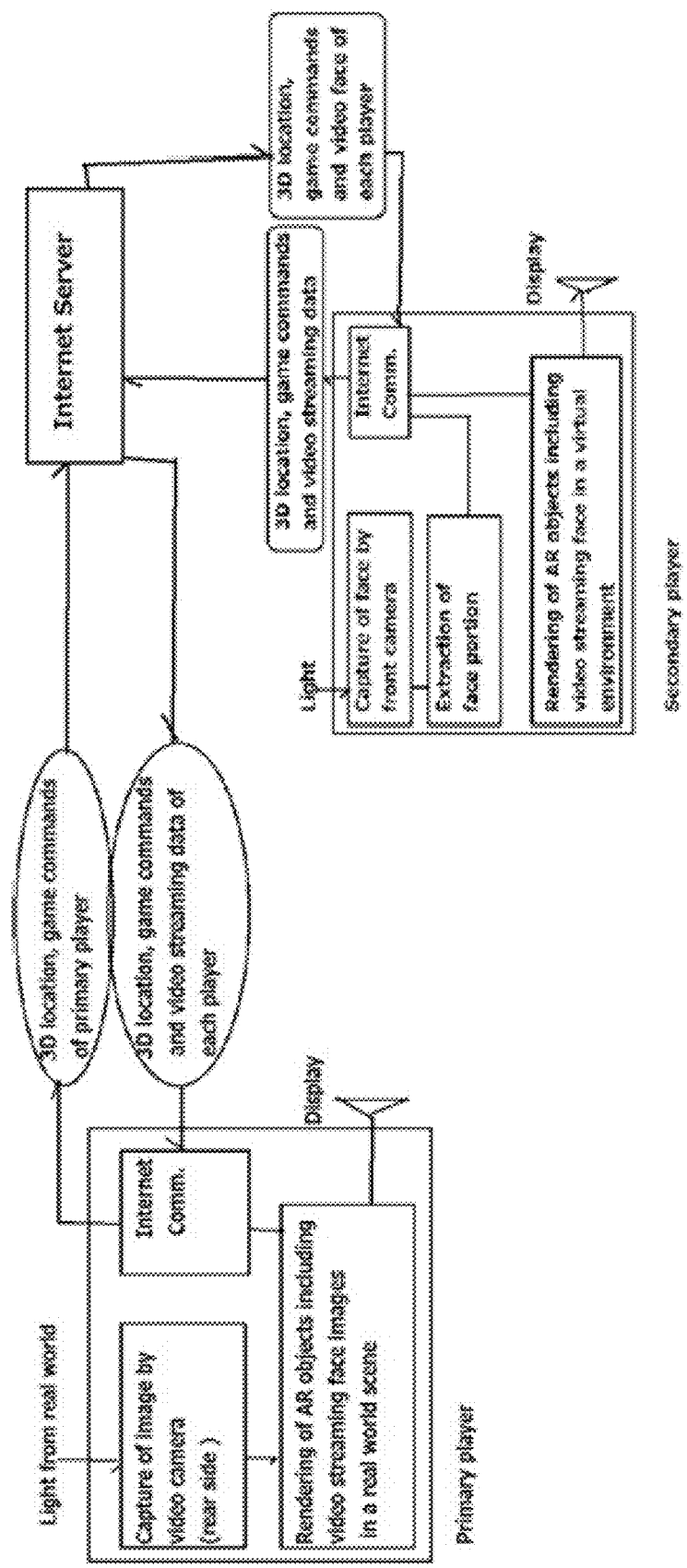
FIG. 7C is a block diagram illustrating functions performed by an AR gaming application in connection with the schematic illustrations of FIGS. 7A-7B.

FIG. 7C is a block diagram illustrating functions performed by an AR gaming application in connection with the schematic illustrations of FIGS. 7A-7B. As shown in FIG. 7C, the computer device operated by a primary player captures a light from the real world (e.g., a real room) through, for example, a conventional video sensor installed at the rear side of the computer device. An Internet server communication module of the computer device acquires, from an Internet server, data for 3D location, gaming commands and video streaming of face for each player (including each secondary player and other primary player). The Internet server communication module also sends the 3D location of the primary player and his/her gaming commands to the Internet server. A computer device operated by a secondary player captures his/her face by a front video camera of that computer device, and extracts the face portion. Then, the video streaming data of the face, the game commands and his/her 3D location in the 3D virtual environment are sent to the Internet server through an Internet server communication module of the computer device operated by the secondary player. The Internet communication module also receives the 3D location, video streaming of face and game commands of each player (including each primary player and other secondary player). A 3D rendering module of the computer device operated by the primary player or the computer device operated by the secondary player displays, to each corresponding player respectively, AR object with video face of each player in the 3D virtual environment.

FIGS. 8A-8F are schematic illustrations of generating a hybrid reality environment for performance art in accordance with some embodiments. Such a hybrid reality environment provides audience with a mixed scene of real actors/actresses and AR avatars on an AR stage. The actors and actresses are not limited to perform at one location. The AR stage allows each performer to be located at different places. The audience can watch performance by performers at the stage and performance by performers at other locations simultaneously in the real world using mobile devices (e.g. AR glass, tablet, smart phone, etc.).

FIG. 8A depicts a basic concept of a mixed realty theater. As shown in FIG. 8A, the actual stage includes a dedicated PC with a large screen to display the mixed reality scene to actors/actresses on the stage, and a video camera to capture the entire performing area of the stage including an AR marker located on the right or left side of the stage. A primary actor (e.g., the man on the right) is standing on the stage in the real world.

FIG. 8B depicts the AV based environment for a secondary actor and a secondary actress located at locations different from the physical stage in FIG. 8A. In FIG. 8B, a large PC screen for a secondary performer receives and displays the real-time streaming of AR video scenes generated by the PC at the stage in FIG. 8A through a server. The secondary performer can make his or her next gesture or movement while he or she watches the live steaming scenes of the AR stage via the large PC screen. A 3D depth sensor installed at the PC screen captures the 3D body movement of the secondary performer. The captured data includes change in 3D positions of captured body and skeleton parameters to control the bone based kinetics of a 3D avatar. The captured data is then sent to the stage through the server to display the 3D avatar of the secondary performer in pixel coordinates of the stage PC screen.

Figure 8D:
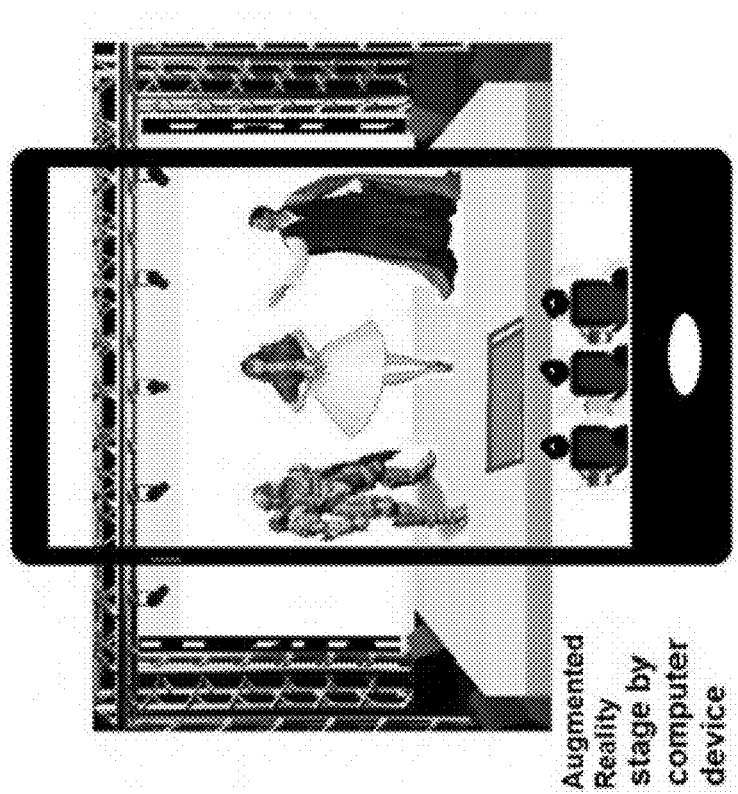
Figure 8C:
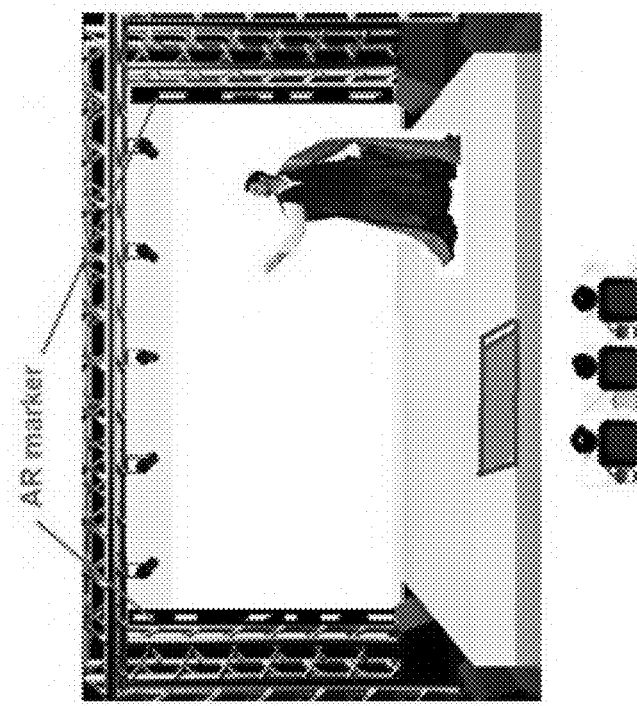

FIGS. 8C and 8D depict how audience can watch the performance in the AR reality at the stage. On one hand, FIG. 8C illustrates the audience watching an actual scene of the stage when the audience does not have a computer device such as a smart phone or an AR glass. In this scenario, the audience can only see the performer physically at the stage, but not the performers at other locations. On the other hand, FIG. 8D illustrates the audience watching the AR performance using a computer device such as a smart phone or an AR glass. In this scenario, the stage PC can generate and upload a real-time video streaming of AR scenes in the stage through the server. Each audience can download and enjoy the live video scene of performance using, for example, an AR glass or a mobile device. The AR application program captures the AR markers and overlays the 3D AR avatars in the screen of the computer device.

Figure 8F:
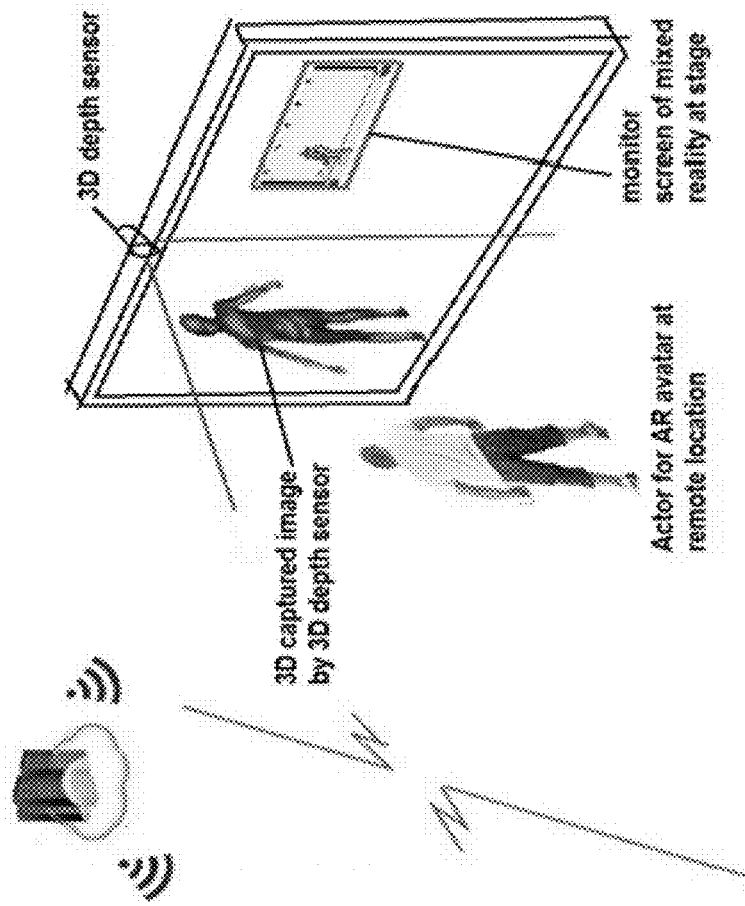
Figure 8E:
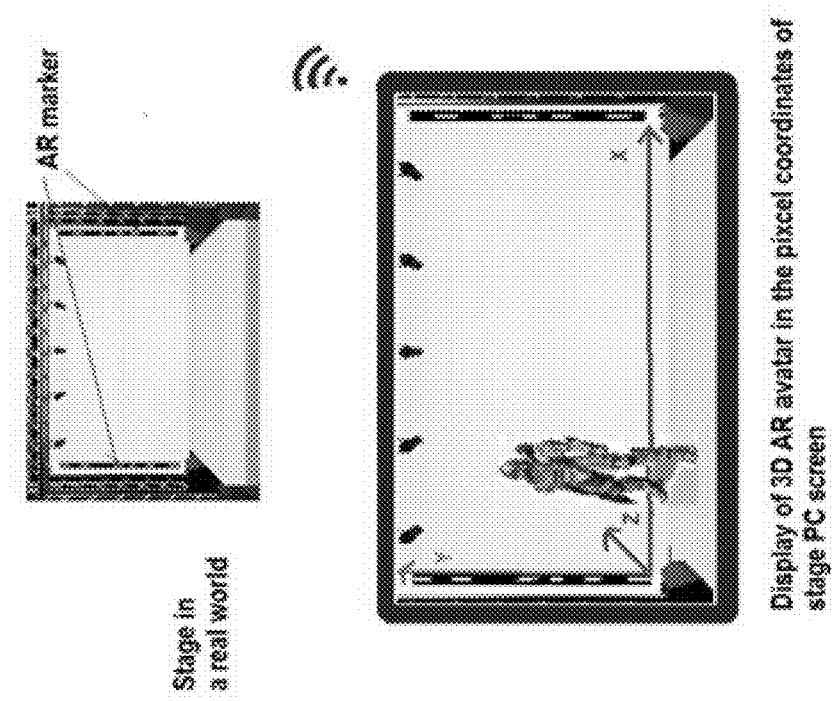

FIG. 8E depicts the generation and display of an AR scene by a stage PC. The PC captures AR markers located at the right and left sides of the stage. The AR marker image and its local coordinates can be identified using 3D coordinates, then the 3D location of the AR marker plane is converted to an image in 2D pixel coordinates by some known AR software methods such as, for example, projective transform algorithm, which is well known in the computer vision field. Using the marker recognition method described above, the AR application software can overlay 2D or 3D AR objects in the pixel coordinates of the screen of the computer device (e.g., mobile device, AR glass).

In FIG. 8F, a secondary actor is practicing his performance using a 3D depth sensor and a monitor screen that shows an AR scene in the large PC at an AV based environment. The PC for the AV based environment for a secondary actor or actress provides a 3D depth sensing and display of its raw data image to acquire 3D body gesture data of that secondary actor or actress including necessary parameters to manipulate the computer generated skeleton of a 3D avatar model and changes in 3D locations of the captured body. Then, the captured data with an initial 3D location of the AR avatar in the local coordinates of the AR marker plane is sent to the stage PC, which then utilizes the captured location data and gesture data of the secondary actor or actress to render his or her 3D avatar model in the pixel coordinates of the screen of the stage PC.

In some embodiments, as shown and described above with respect to FIGS. 8A-8F, the audience is not included in the primary performers that are physically located and perform on the stage, and not included in the secondary performers that are located and perform at remote location(s). In some instances, the audience are sitting in front of the stage and watching the primary performers on the stage. In such instances, the server device can send signals to computer devices (e.g., mobile devices, AR glasses) used by those audience such that scenes of the AR based environment are displayed via the computer devices to those audience, wherein the AR based environment includes the primary performers as real persons as well as virtual objects (e.g., AR avatars) related to the secondary performers. In such instances, the scenes of the AR based environment displayed to the audience are different from scenes of the AR based environment that are displayed to the primary performers. For example, a primary performer is not able to see herself or any virtual object related to her in a scene of the AR based environment that is displayed to her. On the contrary, an audience can see a scene of the AR based environment that includes all primary performers.

In some other instances, the audience are not sitting in front of the stage and not watching the primary performers on the stage. Instead, the audience are watching the performance at a remote location and using a computer device (e.g., a screen). In such instances, the server device can send signals to computer devices (e.g., mobile devices, AR glasses) used by those audience such that scenes of the AV based environment are displayed via the computer devices to those audience, wherein the AV based environment includes virtual objects (e.g., AR avatars) related to both the primary performers and the secondary performers. In such instances, the scenes of the AV based environment displayed to the audience are different from scenes of the AV based environment that are displayed to the secondary performers. For example, a secondary performer is not able to see any virtual object related to her in a scene of the AV based environment that is displayed to her. On the contrary, an audience can see a scene of the AV based environment that includes virtual objects related to all the secondary performers.

Figure 9A:
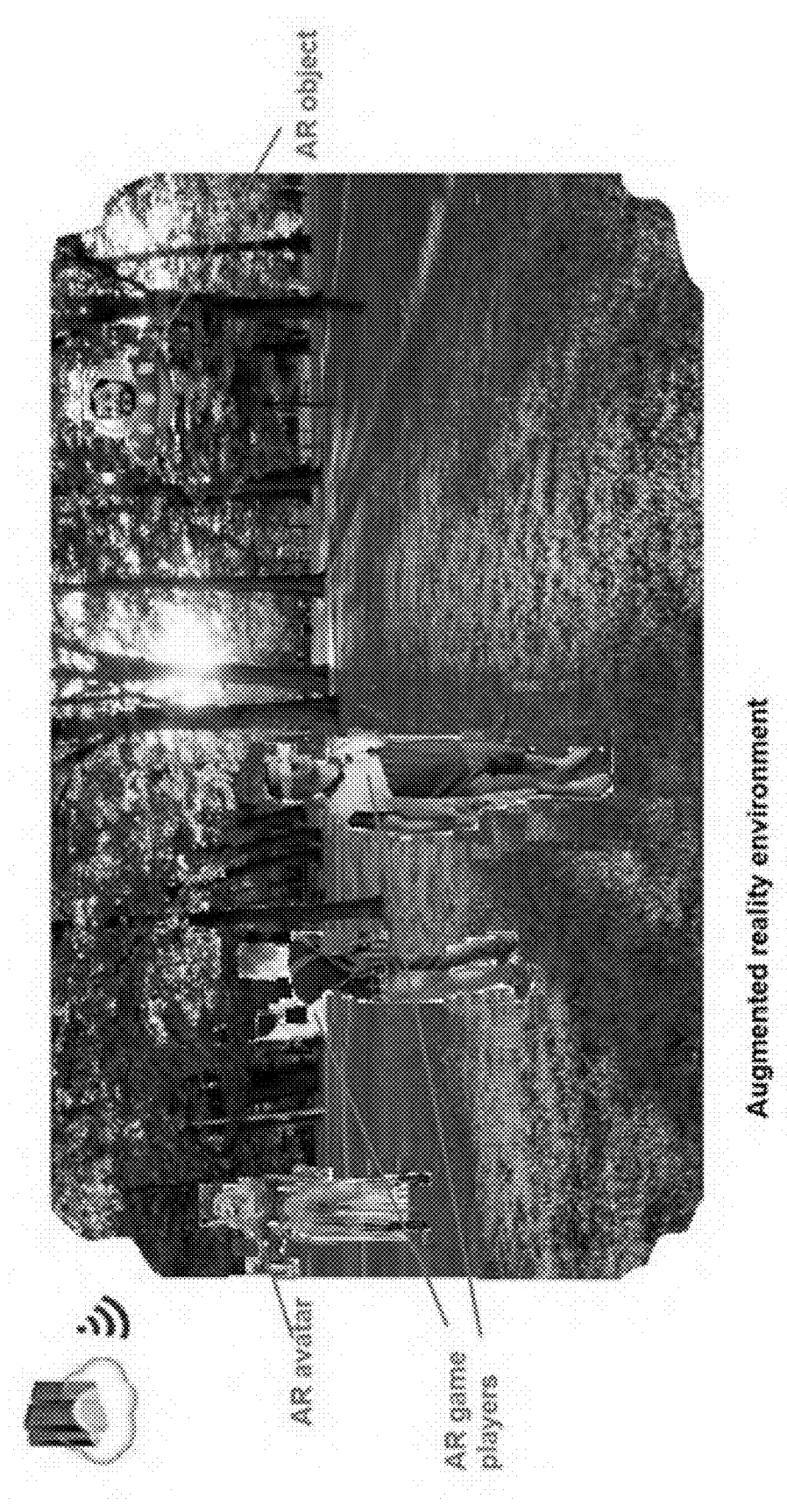
FIGS. 9A-9E are schematic illustrations of generating a hybrid reality environment for outdoor gaming in accordance with some embodiments.

FIGS. 9A-9E are schematic illustrations of generating a hybrid reality environment for outdoor gaming in accordance with some embodiments. Specifically, FIG. 9A depicts primary players in a real world environment. Each primary player has his/her own AR glass or mobile device (e.g., tablet PC or smart phone). These devices can have a capability to send six degrees of freedom (6DOF) pose information of the mobile device such as, for example, 3D location data (e.g., latitude, longitude, altitude (LLA) information from GPS), orientation data from built-in device sensors of gyration, north compass and gravity vector, and/or the like. Such data can be sent to another player's computer device through a server.

In some embodiments, the 6DOF location/pose dataset described above allows the rendering of an AR object (e.g., avatar) related to a primary player "naturally" (that is, the orientation of the AR object is matched to the gravity vector) in scenes of the AV based environment for secondary players. In some embodiments, the 6DOF data is easily computed using standard software package provided by mobile device vendors (e.g., 3D location data from iPhone SDK) through the conversion of raw data from a built-in sensor.

In FIG. 9A, each primary player can watch virtual objects (e.g., AR objects) related to the secondary players in his/her screen and interact with those secondary players under the AR application installed in the mobile device of that primary player. Such an AR application can receive real-time 6DOF location/pose data of the secondary players, then render the virtual objects (e.g., AR avatar or flying vehicle object) as if they exist in the real world environment.

Figure 9C:
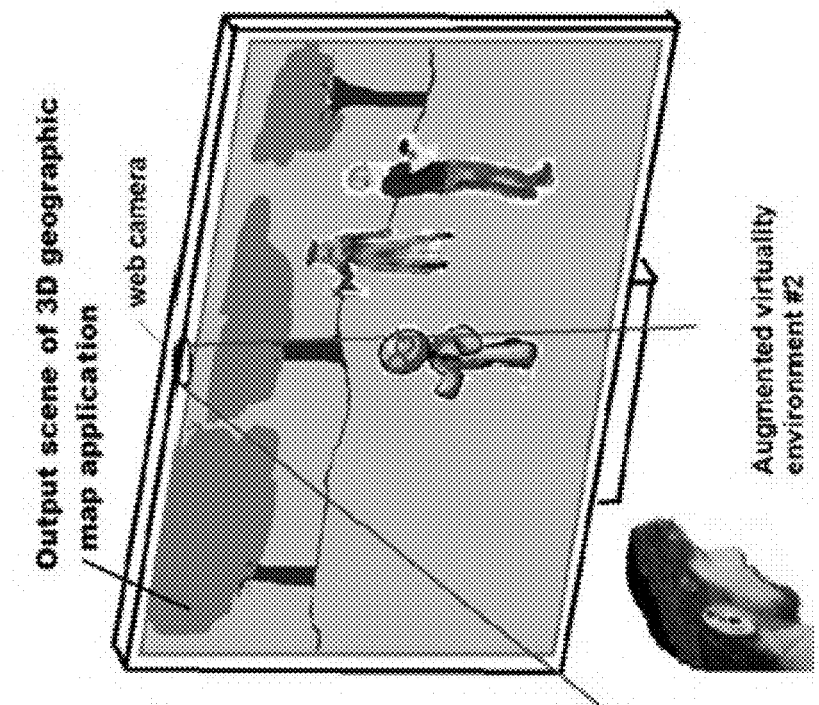
Figure 9B:
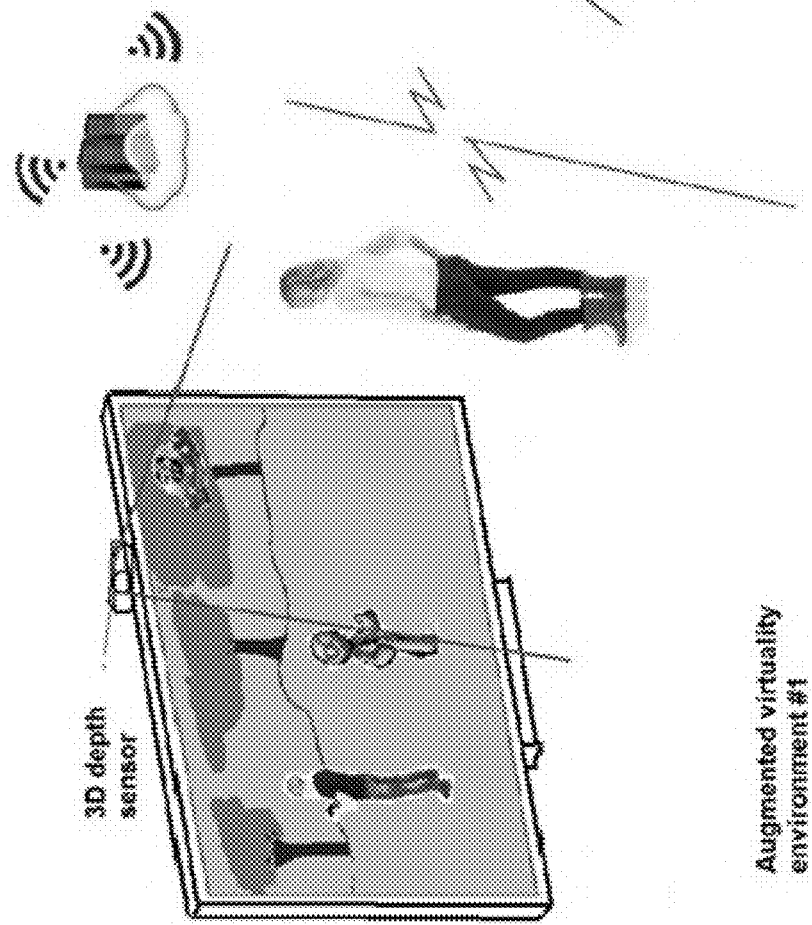

FIG. 9B depicts a scene of the AV based environment with 3D depth sensing of a female secondary player. The female secondary player watches a specified location in the AV based environment provided by the 3D geographical application corresponding to the 3D geographic location (e.g., LLA information) of the primary players. An AV application renders a virtual object (e.g., AR object) related to each primary player at an equivalent or substantially similar location to the 3D location data of the primary player in the 3D virtual world. In FIG. 9B, a primary player is rendered as a blue colored avatar wearing glasses and another primary player is rendered as a grey colored avatar with tablet. A 3D depth sensor installed at the screen can be used to measure the movement or gesture of the female secondary player's body. The dataset obtained from the 3D depth sensor includes real-time measurement of kinetic parameters that are utilized for the body gesture of the avatar model and changes in the 3D positions of the body. Thus, navigation commands of the avatar's body can be generated by the movement or gesture of the female secondary player when the initial condition of 3D location and body pose parameters are also given as initial data by the female secondary player. In FIG. 9A, the avatar of the female secondary player is rendered as a "zombie" lady in the camera view screen of the primary player's device in the real world. In the corresponding AV environment of FIG. 9C, the avatar of the female secondary player is also rendered as the "zombie" lady in the large PC screen in the AV based environment for another male secondary player.

FIG. 9C depicts another scene of the AV based environment with web camera for capturing the face of another male secondary player. The male secondary player in the AV based environment can use computer peripherals (e.g. mouse, keyboard, game control pad, remote controller, etc.) to generate LLA based 3D location changes. The LLA location data is utilized to navigate the virtual flying vehicle related to the male secondary player that is rendered in the camera view screen of the primary players in the real world environment (as shown in FIG. 9A). The 3D location data is also used to display the virtual flying vehicle in the large PC screen for the female secondary player (as shown in FIG. 9B). The web camera captures the male secondary player's face and sends its texture image (e.g., real-time streaming data of face images) to map the face onto the virtual flying vehicle rendered in the mixed reality environment (both the AR based environment and the AV based environment).

Figure 9E:
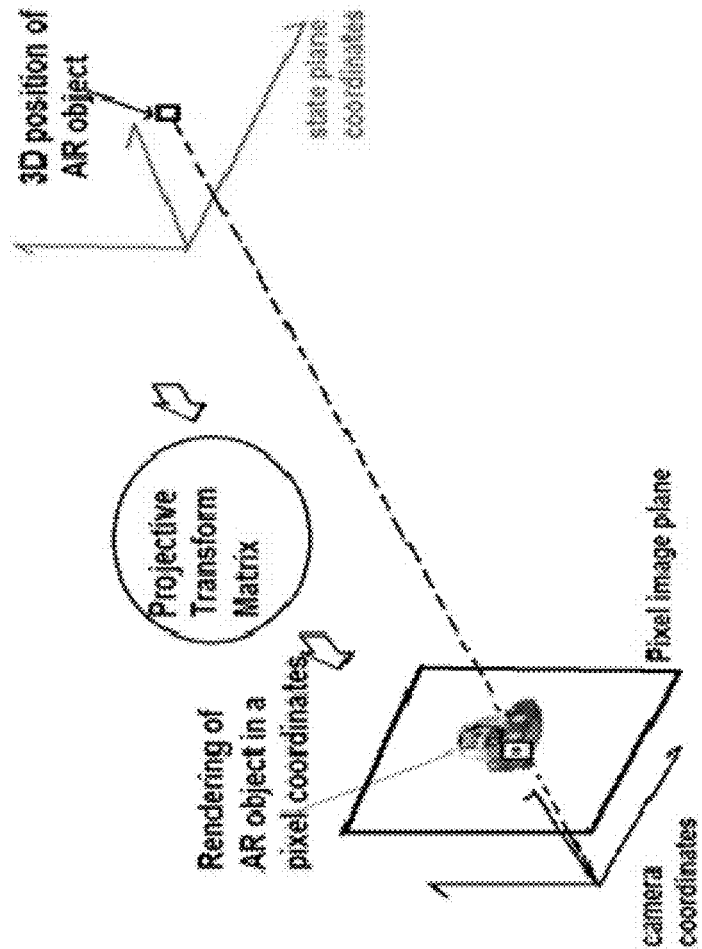
Figure 9D:
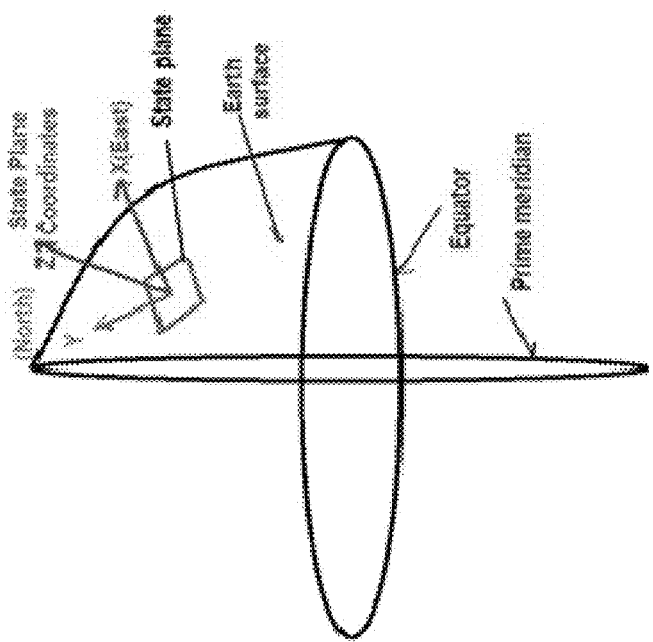

FIGS. 9D and 9E illustrate how to render 3D AR object/avatar image corresponding to a secondary player into the pixel image coordinates of camera screen of a primary player who is located in the real world. In FIG. 9D, the state plane coordinates system is illustrated. The longitude/latitude/altitude (LLA) data is converted to the local XYZ coordinates or state plane coordinates. The adoption of the Cartesian (X-Y) coordinates system rather than the LLA data makes the rendering of 3D AR objects much easier in terms of software algorithm. For the outdoor AR application, in some embodiments, the state plane coordinates system, rather than the LLA data, can be used for registration of 2D/3D AR object as location data to simplify calculations. In some other embodiments, although not shown and described herein, any suitable coordinates system (e.g., the Cartesian coordinates system, the LLA data) can be used to render 3D AR objects.

FIG. 9E depicts the basic idea of conversion of a 3D AR object defined in the state plane coordinates system to 2D pixel coordinates of mobile camera by projective transform matrix to render the AR object in a video camera screen of the primary player. The fundamental calculation to render the 3D AR object corresponding to the secondary player in the AV based environment into the camera view screen of mobile device of the primary player in the AR based environment includes the following steps.

STEP 0: Select a specific outdoor location and pick the geographic zone among 124 predefined state plane coordinates zones in the U.S. The selected state plane coordinates zone shall be used for conversion between longitude/latitude data and XY location data in the specified geographic zone. The origin vector of state plane coordinates is expressed as $Osp=[0,0,0]^T$.

STEP 1: Initialize data for 3D location (i.e., LLA and height Z from the ground surface) of the AR object/avatar corresponding to the secondary player's virtual position in the outdoor location. The secondary player can input his/her initial location with LLA unit in the 3D geographic application software using computer peripherals.

STEP 2: Conversion of LLA data in STEP 1 to XY position data in the state plane coordinates system with height Z from the ground surface. The converted 3D position of AR avatar=$[Xar_x, Yar_y, Zar_z, 1]^T$.

STEP 3: Conversion of LLA and Z data for the primary player's mobile device to state plane coordinates. The converted 3D position of the primary player's mobile camera in the state plane coordinates is $Xc=[Xcx, Ycy, Zcz, 1]^T$.

STEP 4: Computation of 2D AR object image position in the pixel coordinates using the projective transform equation. It is executed by the AR application in the primary player's device. The detailed process is described below.

The following equation is used for conversion of an assumed 3D AR object defined in the state plane coordinates system to render it in the pixel coordinates of camera screen of mobile device. This equation is well known as a projective transform equation in the computer vision field.

$S*Xp=I*E*Xar$, where, S represents an initial scaling parameter for rendering of 2D AR object image in the pixel coordinates; $Xp=[x, y, 1]^T$ represents the 2D position of AR object image in the pixel plane coordinates, and is a 3×3 column vector (i.e., transposed vector) of the row vector [x, y, 1]; I*E is a 4×4 projective transform matrix from the 3D state plane coordinates to camera coordinates; I is a 4×4 intrinsic parameter matrix for camera lens calibration; E=[R*t] is a 4×4 extrinsic parameter matrix that expresses rotation and translation between camera coordinates and state plane coordinates (where R=4×4 is a rotation matrix about the XYZ axis in the camera coordinates, and t=$[tx, ty, tz, 1]^T$ is a translation vector from the origin of camera coordinates to the origin of state plane coordinates); and $Xar=[Xar_x, Xar_y, Xar_z, 1]^T$ is a 4×4 3D position vector of AR object in the state plane coordinates.

In this equation, Xar is determined in STEP 1. The rotation matrix R in the extrinsic matrix E can be computed using orientation sensor data from mobile device sensors (e.g., gyro, compass and gravity vector data set). The translation vector t can be computed by the subtraction of the 3D position of origin of camera coordinates from the origin of the state plane coordinates (i.e., Xc−Osp). The intrinsic matrix can be determined by the camera calibration stage in an off-line manner. Thus, the unknown vector value of 2D AR object image Xp in the pixel coordinates can be obtained from the known terms described above. Once the 2D position of AR object image Xp is calculated, the AR application can render the AR object image in the pixel coordinates of video camera screen.

STEP 5: The secondary player navigates the AR object corresponding to his/her virtual 3D position in the AV based environment (e.g., in the 3D geographical map application) by computer peripherals.

STEP 6: Using new data of changes in the 3D position through the AR server, the updated calculation of 2D position of AR object image Xp is executed in STEP 4 and the resulted new position of the AR object image is rendered in the pixel coordinates.

In some embodiments, the above calculation steps can be used for the rendering of an AR avatar corresponding to a primary player in the AV based environment screen for a secondary player except the calculation of projective transform. In such embodiments, the 3D position of the AR avatar corresponding to the primary player is rendered in the AV based environment (e.g., 3D geographic map application) as described below.

STEP i: Initialization of 3D location (e.g., LLA and height Z from the ground surface) for an AR object/avatar corresponding to the primary player is sent from his/her mobile device to the secondary player's PC through the server.

STEP ii: The secondary player's PC utilizes the data in STEP i to render the AR avatar icon in the AV based environment.

STEP iii: When the primary player moves, the mobile device continuously sends the updated 3D location data of the primary player to the secondary player's PC.

STEP iv: The secondary player's PC can update the 3D location of the AR avatar icon.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of generating a hybrid reality environment of real and virtual objects comprising:
    at a computer system having one or more processors and memory for storing a program to be executed by the one or more processors:
    receiving data of a first group of users located at a first physical location;
    receiving data of a second group of users, each user from the second group of users being located at a physical location different from the first physical location;
    generating, for each user from the first group of users, a scene of an augmented reality (AR) based environment, the AR based environment including the first group of users and one or more virtual objects related to the second group of users that are generated based on the data of the second group of users;
    generating, for each user from the second group of users, a scene of an augmented virtuality (AV) based environment, the AV based environment including the one or more virtual objects related to the second group of users and one or more virtual objects related to the first group of users that are generated based on the data of the first group of users;
    sending signals for displaying the scene of the AR based environment to a user from the first group of users such that the user can interact with the one or more virtual objects related to the second group of users in real time within the AR based environment; and
    sending signals for displaying the scene of the AV based environment to a user from the second group of users such that the user can manipulate a virtual object related to that user to interact with the one or more virtual objects related to the first group of users in real time within the AV based environments;
    wherein the scene of the AR based environment displayed to the user from the first group of users forms at least a part of a first set of scenes and the scene of the AV based environment displayed to the user from the second group of users forms at least a part of a second set of scenes, the method further comprising:
    sending signals for displaying, to an audience not included in the first group of users or the second group of users, differentiated from the first and second group of users by a set of AR markers, a third set of scenes of the AR based environment that are different from the first and second set of scenes.

2. The method of claim 1, wherein the second group of users includes a plurality of users and at least two users from the second group of users are located at two different physical locations.

3. The method of claim 1, wherein the data of the first group of users includes data associated with a location, orientation, posture, or movement of a user from the first group of users.

4. The method of claim 1, wherein the data of the first group of users includes three-dimensional (3D) data associated with the first group of users.

5. The method of claim 4, wherein the 3D data comprises data associated with computer generated 3D geographic map enhanced by texture mapping of earth satellite image.

6. The method of claim 1, wherein the data of the second group of users includes face image data of a user from the second group of users.

7. The method of claim 6, wherein the face image data of the user comprises real-time video and audio data packets including extracted image data of that user's face that is captured by a video camera for the second group of users.

8. The method of claim 1, wherein generating the scene of the AR based environment includes scanning a background environment surrounding the first group of users using a three-dimensional (3D) depth sensor.

9. The method of claim 1, wherein generating the scene of the AR based environment or the scene of the AV based environment includes generating a virtual object related to a user from the second group of users by mapping a picture of that user onto a surface of an AR object associated with that user.

10. The method of claim 1, wherein generating the scene of the AR based environment includes generating the scene for displaying a movement of a virtual object related to a user from the second group of users, the movement being controlled by that user in real time.

11. The method of claim 1, wherein generating the scene of the AV based environment includes generating the scene for displaying a movement of a virtual object related to a user from the first group of users that corresponds to a movement of that user in real time.

12. The method of claim 1, wherein the scene of the AR based environment displayed to the user from the first group of users does not include a virtual object related to that user.

13. The method of claim 1, wherein the scene of the AV based environment displayed to the user from the second group of users does not include a virtual object related to that user.

14. The method of claim 1, wherein sending signals for displaying the scene of the AR based environment to the user from the first group of users includes sending signals to a computer device associated with that user such that the scene of the AR based environment is displayed on the computer device to that user.

15. The method of claim 1, wherein sending signals for displaying the scene of the AV based environment to the user from the second group of users includes sending signals to a computer device associated with that user such that the scene of the AV based environment is displayed on the computer device to that user.

16. The method of claim 1, wherein the AV based environment is a virtualized realization of the AR based environment.

17. A server device configured to generate a hybrid reality environment of real and virtual objects, comprising:

one or more processors; and memory storing one or more programs to be executed by the one or more processors, the one or more programs comprising instructions for:

receiving data of a first group of users located at a first physical location;

receiving data of a second group of users, each user from the second group of users being located at a physical location different from the first physical location;

generating, for each user from the first group of users, a scene of an augmented reality (AR) based environment, the AR based environment including the first group of users and one or more virtual objects related to the second group of users that are generated based on the data of the second group of users;

generating, for each user from the second group of users, a scene of an augmented virtuality (AV) based environment, the AV based environment including the one or more virtual objects related to the second group of users and one or more virtual objects related to the first group of users that are generated based on the data of the first group of users;

sending signals for displaying the scene of the AR based environment to a user from the first group of users such that the user can interact with the one or more virtual objects related to the second group of users in real time within the AR based environment; and sending signals for displaying the scene of the AV based environment to a user from the second group of users such that the user can manipulate a virtual object related to that user to interact with the one or more virtual objects related to the first group of users in real time within the AV based environments;

wherein the scene of the AR based environment displayed to the user from the first group of users forms at least a part of a first set of scenes and the scene of the AV based environment displayed to the user from the second group of users forms at least a part of a second set of scenes, the one or more programs further comprising instructions for:

sending signals for displaying, to an audience not included in the first group of users or the second group of users, differentiated from the first and second group of users by a set of AR markers, a third set of scenes of the AR based environment that are different from the first and second set of scenes.

18. The server device of claim 17, wherein generating the scene of the AR based environment includes scanning a background environment surrounding the first group of users.

19. The server device of claim 17, wherein the scene of the AR based environment displayed to the user from the first group of users does not include a virtual object related to that user.

20. The server device of claim 17, wherein the scene of the AV based environment displayed to the user from the second group of users does not include a virtual object related to that user.

21. A non-transitory computer readable storage medium storing one or more programs, the one or more programs comprising instructions, which, when executed by one or more processors, cause the processors to perform operations comprising:

at a server device:

receiving data of a first group of users located at a first physical location;

receiving data of a second group of users, each user from the second group of users being located at a physical location different from the first physical location;

generating, for each user from the first group of users, a scene of an augmented reality (AR) based environment, the AR based environment including the first group of users and one or more virtual objects related to the second group of users that are generated based on the data of the second group of users;

generating, for each user from the second group of users, a scene of an augmented virtuality (AV) based environment, the augmented virtuality based environment including the one or more virtual objects related to the second group of users and one or more virtual objects related to the first group of users that are generated based on the data of the first group of users;

sending signals for displaying the scene of the AR based environment to a user from the first group of users such that the user can interact with the one or more virtual objects related to the second group of users in real time within the AR based environment; and sending signals for displaying the scene of the AV based environment to a user from the second group of users such that the user can manipulate a virtual object related to that user to interact with the one or more virtual objects related to the first group of users in real time within the AV based environment;

wherein the scene of the AR based environment displayed to the user from the first group of users forms at least a part of a first set of scenes and the scene of the AV based environment displayed to the user from the second group of users forms at least a part of a second set of scenes, the one or more programs further comprising instructions for:

sending signals for displaying, to an audience not included in the first group of users or the second group of users, differentiated from the first and second group of users by a set of AR markers, a third set of scenes of the AR based environment that are different from the first and second set of scenes.

22. The non-transitory computer readable storage medium of claim 21, wherein generating the scene of the AR based environment includes generating the scene for displaying a movement of a virtual object related to a user from the second group of users, the movement being controlled by that user in real time.

23. The non-transitory computer readable storage medium of claim 21, wherein generating the scene of the AV based environment includes generating the scene for displaying a movement of a virtual object related to a user from the first group of users that corresponds to a movement of that user in real time.

* * * * *